(12) United States Patent
Chendamarai Kannan et al.

(10) Patent No.: US 11,284,424 B2
(45) Date of Patent: *Mar. 22, 2022

(54) UPLINK PAYLOAD DETERMINATION AND UPLINK GRANT INDICATION FOR MULTEFIRE

(71) Applicant: QUALCOMM Incorporated, San Diego, CA (US)

(72) Inventors: Arumugam Chendamarai Kannan, San Diego, CA (US); Chirag Patel, San Diego, CA (US); Tao Luo, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/803,912

(22) Filed: Feb. 27, 2020

(65) Prior Publication Data

US 2020/0205184 A1 Jun. 25, 2020

Related U.S. Application Data

(63) Continuation of application No. 15/492,461, filed on Apr. 20, 2017, now Pat. No. 10,616,912.

(Continued)

(51) Int. Cl.
*H04W 72/12* (2009.01)
*H04L 5/00* (2006.01)
(Continued)

(52) U.S. Cl.
CPC ....... *H04W 72/1284* (2013.01); *H04L 5/0055* (2013.01); *H04L 1/1812* (2013.01);
(Continued)

(58) Field of Classification Search
CPC .................. H04W 72/1284; H04L 5/0055
(Continued)

(56) References Cited

U.S. PATENT DOCUMENTS

| 8,412,209 B2 | 4/2013 | Whinnett et al. |
| 8,867,501 B2 | 10/2014 | Wang et al. |

(Continued)

FOREIGN PATENT DOCUMENTS

| CN | 103314547 A | 9/2013 |
| EP | 2908585 A1 | 8/2015 |

(Continued)

OTHER PUBLICATIONS

3GPP TSG RAN WG1 Meeting #82 R1-154420; HARQ-ACK transmission for Rel-13 CA enhancement; ericsson Beijing, China, Aug. 24-28, 2015.*

(Continued)

*Primary Examiner* — Faisal Choudhury
(74) *Attorney, Agent, or Firm* — Holland & Hart LLP/Qualcomm

(57) ABSTRACT

Methods, systems, and devices for wireless communication are described. The payload size for uplink transmissions of unscheduled control information may vary and, in some cases, may be dynamically determined. A user equipment (UE) may determine a payload size or may select a payload size from a set of predetermined sizes. A base station may independently determine the same payload size or it may blindly detect the payload size upon receiving the uplink (UL) transmission. Or the base station may indicate the payload size to the UE. Additionally, UL grants issued to the UE may take one of several forms (e.g., different downlink control indicator formats), and characteristics of the grant may indicate information about resources assigned by the grant, including a location of the resources among various (Continued)

transmission opportunities or whether the grant is for multiple subframes.

40 Claims, 17 Drawing Sheets

Related U.S. Application Data

(60) Provisional application No. 62/326,703, filed on Apr. 22, 2016.

(51) Int. Cl.
  *H04L 1/18* (2006.01)
  *H04W 72/14* (2009.01)

(52) U.S. Cl.
  CPC ............ *H04L 5/001* (2013.01); *H04L 5/0064* (2013.01); *H04W 72/14* (2013.01)

(58) Field of Classification Search
  USPC ........................................................ 370/329
  See application file for complete search history.

(56) References Cited

U.S. PATENT DOCUMENTS

| | | | |
|---|---|---|---|
| 9,538,527 B2 | 1/2017 | Yan et al. | |
| 9,591,644 B2 | 3/2017 | Chen et al. | |
| 10,135,595 B2 | 11/2018 | Gerstenberger et al. | |
| 2008/0316959 A1* | 12/2008 | Bachl ................ | H04W 72/1284 370/329 |
| 2009/0161545 A1* | 6/2009 | Ho ...................... | H04L 47/263 370/235 |
| 2010/0111107 A1 | 5/2010 | Han et al. | |
| 2010/0323743 A1* | 12/2010 | Huan ................ | H04W 52/367 455/522 |
| 2011/0141928 A1 | 6/2011 | Shin et al. | |
| 2012/0170510 A1 | 7/2012 | Kim et al. | |
| 2013/0272196 A1 | 10/2013 | Li et al. | |
| 2014/0036808 A1* | 2/2014 | Pelletier ................ | H04W 72/14 370/329 |
| 2014/0056273 A1 | 2/2014 | Jang et al. | |
| 2014/0105164 A1 | 4/2014 | Moulsley et al. | |
| 2014/0126495 A1* | 5/2014 | Kubota ................ | H04W 72/14 370/329 |
| 2014/0286276 A1* | 9/2014 | Lunttila ................ | H04B 7/024 370/329 |
| 2015/0063318 A1 | 3/2015 | Merlin et al. | |
| 2015/0078231 A1 | 3/2015 | Bergström et al. | |
| 2015/0092702 A1* | 4/2015 | Chen ................... | H04W 72/082 370/329 |
| 2015/0319753 A1 | 11/2015 | Chen et al. | |
| 2016/0261321 A1 | 9/2016 | Andgart et al. | |
| 2016/0374070 A1 | 12/2016 | Ghosh | |
| 2017/0117991 A1* | 4/2017 | Liu ........................ | H04L 1/1887 |
| 2017/0311343 A1 | 10/2017 | Chendamarai et al. | |
| 2018/0159665 A1 | 6/2018 | Yang et al. | |
| 2018/0279266 A1* | 9/2018 | Li .......................... | H04B 7/0456 |
| 2019/0053223 A1* | 2/2019 | Zhou ................ | H04W 72/1268 |
| 2020/0205184 A1* | 6/2020 | Chendamarai Kannan ................ | H04W 72/1284 |

FOREIGN PATENT DOCUMENTS

| | | |
|---|---|---|
| JP | 2016027763 A | 2/2016 |
| RU | 2562102 C2 | 9/2015 |
| RU | 2562800 C1 | 9/2015 |
| WO | WO-2012177634 A1 | 12/2012 |
| WO | WO-2015023910 A2 | 2/2015 |
| WO | WO-2016032776 A1 | 3/2016 |

OTHER PUBLICATIONS

International Search Report and Written Opinion—PCT/US2017/028754—ISA/EPO—dated Jul. 4, 2017.
IPEA/EP, Second Written Opinion of the International Preliminary Examining Authority, Int'l Application No. PCT/US2017/028754, dated Mar. 26, 2018, European Patent Office, Munich, DE, 6 pgs.
QUALCOMM Incorporated: "PUCCH design details", 3GPP TSG RAN WG1 #84bis; R1-163025, 3rd Generation Partnership Project {3GPP), Mobile Competence Centre; 650, Route Des Lucioles ; F-06921, Sophia-Antipolis Cedex ; France, vol. RAN WG1, No. Busan, Korea; Apr. 11, 2016-Apr. 15, 2016, Apr. 2, 2016 (Apr. 2, 2016), XP051080469, 3 pages. Retrieved from the Internet: URL: http://www.3gpp.org/ftp/tsg_ran/WG1_RL1/TSGR1_84b/Docs/ [retrieved on Apr. 2, 2016].
Taiwan Search Report—TW106113498—TIPO—dated Feb. 4, 2021.
QUALCOMM Incorporated: "Resource Allocation for Autonomous UL Access", 3GPP TSG RAN WG1 #90b, 3GPP Draft; R1-1718122 Resource Allocation For Autonomous UL Access, 3rd Generation Partnership Project (3GPP), Mobile Competence Centre ; 650, Route Des Lucioles ; F-06921 Sophia-Antipolis Cedex; FR, vol. RAN WG1, No. Prague, Czech; Oct. 9, 2017-Oct. 13, 2017, Oct. 8, 2017 (Oct. 8, 2017), XP051341304, 4 Pages, Retrieved from the Internet: URL: http://www.3gpp.org/ftp/tsg_ran/WG1_RL1/TSGR1_90b/Docs/R1-1718122.zip [retrieved on Oct. 8, 2017], Chapter 2.
Samsung: "Resource Allocation for Autonomous UL Access", 3GPP TSG RAN WG1 Meeting 90bis, R1-1717550, Prague, CZ, Oct. 9-13, 2017, URL: http://www.3gpp.org/ftp/tsg_ran/WG1_RL1/TSGR1_90b/Docs/R1-1717550.zip, pp. 1-4.

\* cited by examiner

UPLINK PAYLOAD DETERMINATION AND UPLINK GRANT INDICATION FOR MULTEFIRE

CROSS REFERENCES

The application is a continuation of U.S. patent application Ser. No. 15/492,461, filed Apr. 20, 2017, which claims benefit of U.S. Provisional Patent Application Ser. No. 62/326,703, filed Apr. 22, 2016, which are expressly incorporated herein by reference in their entirety.

BACKGROUND

The following relates generally to wireless communication and more specifically to uplink payload determination and uplink grant indication for MulteFire.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

Some modes of communication may enable communication between a base station and a UE in a shared radio frequency spectrum band. In contrast to a carrier in a licensed spectrum, which may be allocated for use by the devices of one network and may be available to a base station or a UE of that network at predetermined (or all) times, a carrier in shared spectrum may be available intermittently. This intermittent availability may be a result of contention for access to the shared spectrum between devices of different networks (e.g., Wi-Fi devices). The intermittent availability of carriers in a shared spectrum may introduce additional scheduling complexity. In some cases, inefficient scheduling of shared resources may result in reduced throughput for the network devices.

SUMMARY

The present disclosure provides techniques for uplink (UL) scheduling and payload size selection in a shared radio frequency spectrum. The payload size for uplink transmissions of unscheduled control information may vary and may be dynamically determined. A UE may autonomously determine a payload size or may select a payload size from a set of predetermined sizes. The base station may independently determine the same payload size or it may blindly detect the payload size upon receiving the UL transmission. In some examples, the base station indicates the payload size to the UE.

Additionally or alternatively, the UL grants issued to the UE may take multiple forms (e.g., different downlink control indicator formats) and may grant transmissions for the same or different transmission opportunities as well as one or multiple subframes. A UE may determine information about the location of assigned resources based on a format of the message that conveys the grant or from additional information in the grant.

A method of wireless communication is described. The method may include receiving a common downlink control message that includes an indication of available uplink frequency resources of a shared radio frequency spectrum band, determining a payload size of an unscheduled uplink control message based at least in part on uplink control information (UCI) to be included in the unscheduled uplink control message and transmitting the unscheduled uplink control message with the payload size using the available uplink frequency resources.

An apparatus for wireless communication is described. The apparatus may include means for receiving a common downlink control message that includes an indication of available uplink frequency resources of a shared radio frequency spectrum band, means for determining a payload size of an unscheduled uplink control message based at least in part on UCI to be included in the unscheduled uplink control message and means for transmitting the unscheduled uplink control message with the payload size using the available uplink frequency resources.

A further apparatus is described. The apparatus may include a processor, memory in electronic communication with the processor, and instructions stored in the memory. The instructions may be operable to cause the processor to receive a common downlink control message that includes an indication of available uplink frequency resources of a shared radio frequency spectrum band, determine a payload size of an unscheduled uplink control message based at least in part on UCI to be included in the unscheduled uplink control message and transmit the unscheduled uplink control message with the payload size using the available uplink frequency resources.

A non-transitory computer readable medium for wireless communication is described. The non-transitory computer-readable medium may include instructions to cause a processor to receive a common downlink control message that includes an indication of available uplink frequency resources of a shared radio frequency spectrum band, determine a payload size of an unscheduled uplink control message based on UCI to be included in the unscheduled uplink control message and transmit the unscheduled uplink control message with the payload size using the available uplink frequency resources.

In some examples of the method, apparatus, or non-transitory computer-readable medium described above, determining the payload size of the unscheduled uplink control message comprises: selecting the payload size from a set of available payload sizes. In some examples of the method, apparatus, or non-transitory computer-readable medium described above, the common downlink control message includes an indication of the payload size and the payload size is determined based on the indication.

Some examples of the method, apparatus, or non-transitory computer-readable medium described above may further include processes, features, means, or instructions for identifying the UCI to be included in the unscheduled uplink control message based on a number of component carriers for which to acknowledge transmissions, a number of hybrid automatic repeat request (HARQ) processes, a number of bits to convey channel state information (CSI), a system bandwidth, a UCI multiplexing scheme, or a user equipment (UE) coverage range.

In some examples of the method, apparatus, or non-transitory computer-readable medium described above, the unscheduled uplink control message is transmitted using four or fewer modulation symbols associated with the available uplink frequency resources. In some examples of the method, apparatus, or non-transitory computer-readable medium described above, the indication of available uplink frequency resources is an indication of a subframe type.

In some examples of the method, apparatus, or non-transitory computer-readable medium described above, the common downlink control message includes a trigger for the unscheduled uplink control message and additional information associated with a format of the UCI to be included in the unscheduled uplink control message. In some examples of the method, apparatus, or non-transitory computer-readable medium described above, the available uplink frequency resources are associated with a special subframe that includes resources designated for both uplink and downlink communication.

In some examples of the method, apparatus, or non-transitory computer-readable medium described above, the available uplink frequency resources are associated with a periodic uplink subframe. In some examples of the method, apparatus, or non-transitory computer-readable medium described above, the periodic uplink subframe is designated for random access transmissions.

A method of wireless communication is described. The method may include receiving a downlink control message during a first transmission opportunity (TxOP), identifying frequency resources of a shared radio frequency spectrum band for transmission of an uplink message based at least in part on the downlink control message and transmitting at least one uplink message on the frequency resources during the first TxOP or a second TxOP based at least in part the downlink control message.

An apparatus for wireless communication is described. The apparatus may include means for receiving a downlink control message during a first TxOP, means for identifying frequency resources of a shared radio frequency spectrum band for transmission of an uplink message based at least in part on the downlink control message and means for transmitting at least one uplink message on the frequency resources during the first TxOP or a second TxOP based at least in part the downlink control message.

A further apparatus is described. The apparatus may include a processor, memory in electronic communication with the processor, and instructions stored in the memory. The instructions may be operable to cause the processor to receive a downlink control message during a first TxOP, identify frequency resources of a shared radio frequency spectrum band for transmission of an uplink message based at least in part on the downlink control message and transmit at least one uplink message on the frequency resources during the first TxOP or a second TxOP based at least in part the downlink control message.

A non-transitory computer readable medium for wireless communication is described. The non-transitory computer-readable medium may include instructions to cause a processor to receive a downlink control message during a first TxOP, identify frequency resources of a shared radio frequency spectrum band for transmission of an uplink message based on the downlink control message and transmit at least one uplink message on the frequency resources during the first TxOP or a second TxOP based at least in part the downlink control message.

Some examples of the method, apparatus, or non-transitory computer-readable medium described above may further include processes, features, means, or instructions for identifying a downlink control information (DCI) format of the downlink control message. Some examples of the method, apparatus, or non-transitory computer-readable medium described above may further include processes, features, means, or instructions for determining to transmit the at least one uplink message during the first TxOP or the second TxOP based on the DCI format of the downlink control message.

Some examples of the method, apparatus, or non-transitory computer-readable medium described above may further include processes, features, means, or instructions for identifying an indicator in DCI of the downlink control message. Some examples of the method, apparatus, or non-transitory computer-readable medium described above may further include processes, features, means, or instructions for determining a timing offset for the at least one uplink message based on the indicator.

Some examples of the method, apparatus, or non-transitory computer-readable medium described above may further include processes, features, means, or instructions for identifying an indicator in DCI of the downlink control message. Some examples of the method, apparatus, or non-transitory computer-readable medium described above may further include processes, features, means, or instructions for determining a duration of uplink transmissions based on the indicator.

Some examples of the method, apparatus, or non-transitory computer-readable medium described above may further include processes, features, means, or instructions for identifying an indicator in DCI of the downlink control message. Some examples of the method, apparatus, or non-transitory computer-readable medium described above may further include processes, features, means, or instructions for determining to transmit the at least one uplink message during the first TxOP or the second TxOP based on the indicator in the DCI.

Some examples of the method, apparatus, or non-transitory computer-readable medium described above may further include processes, features, means, or instructions for transmitting a set of uplink messages on the frequency resources during the first TxOP. Some examples of the method, apparatus, or non-transitory computer-readable medium described above may further include processes, features, means, or instructions for transmitting a set of uplink messages on the frequency resources during the second TxOP.

Some examples of the method, apparatus, or non-transitory computer-readable medium described above may further include processes, features, means, or instructions for determining a timing relationship between the at least one uplink message and the downlink control message based on DCI in the downlink control message. In some examples of the method, apparatus, or non-transitory computer-readable medium described above, the timing relationship is a fixed time relationship.

In some examples of the method, apparatus, or non-transitory computer-readable medium described above, the timing relationship is a variable time relationship. Some examples of the method, apparatus, or non-transitory computer-readable medium described above may further include processes, features, means, or instructions for identifying a timing relationship between the downlink control message and an uplink triggering message. Some examples of the method, apparatus, or non-transitory computer-readable medium described above may further include processes, features, means, or instructions for monitoring for the uplink triggering message according to the timing relationship.

In some examples of the method, apparatus, or non-transitory computer-readable medium described above, the timing relationship is identified based on an explicit indication in the downlink control message. In some examples of the method, apparatus, or non-transitory computer-readable medium described above, the timing relationship is inferred based on an uplink burst duration, a configuration of the first TxOP, or a configuration of the second TxOP.

A method of wireless communication is described. The method may include transmitting a common downlink control message that includes an indication of available uplink frequency resources of a shared radio frequency spectrum band, receiving an unscheduled uplink control message using the available uplink frequency resources and determining a payload size of an unscheduled uplink control message based at least in part on UCI included in the unscheduled uplink control message.

An apparatus for wireless communication is described. The apparatus may include means for transmitting a common downlink control message that includes an indication of available uplink frequency resources of a shared radio frequency spectrum band, means for receiving an unscheduled uplink control message using the available uplink frequency resources and means for determining a payload size of an unscheduled uplink control message based at least in part on UCI included in the unscheduled uplink control message.

A further apparatus is described. The apparatus may include a processor, memory in electronic communication with the processor, and instructions stored in the memory. The instructions may be operable to cause the processor to transmit a common downlink control message that includes an indication of available uplink frequency resources of a shared radio frequency spectrum band, receive an unscheduled uplink control message using the available uplink frequency resources and determine a payload size of an unscheduled uplink control message based at least in part on UCI included in the unscheduled uplink control message.

A non-transitory computer readable medium for wireless communication is described. The non-transitory computer-readable medium may include instructions to cause a processor to transmit a common downlink control message that includes an indication of available uplink frequency resources of a shared radio frequency spectrum band, receive an unscheduled uplink control message using the available uplink frequency resources and determine a payload size of an unscheduled uplink control message based on UCI included in the unscheduled uplink control message.

Some examples of the method, apparatus, or non-transitory computer-readable medium described above may further include processes, features, means, or instructions for identifying the UCI to be included in the unscheduled uplink control message based on a number of component carriers for which to acknowledge transmissions, a number of HARQ processes, a number of bits to CSI, a system bandwidth, a UCI multiplexing scheme, or a UE coverage range, wherein the payload size is determined based on identifying the UCI.

In some examples of the method, apparatus, or non-transitory computer-readable medium described above, determining the payload size comprises: identifying a set of available payload sizes. Some examples of the method, apparatus, or non-transitory computer-readable medium described above may further include processes, features, means, or instructions for detecting the payload size based on the set of available payload sizes. In some examples of the method, apparatus, or non-transitory computer-readable medium described above, the common downlink control message includes an indication of the payload size and the payload size is determined based on the indication.

A method of wireless communication is described. The method may include transmitting a downlink control message during a first TxOP, identifying frequency resources of a shared radio frequency spectrum band for transmission of an uplink message based at least in part on the downlink control message and receiving at least one uplink message on the frequency resources during the first TxOP or a second TxOP based at least in part the downlink control message.

An apparatus for wireless communication is described. The apparatus may include means for transmitting a downlink control message during a first TxOP, means for identifying frequency resources of a shared radio frequency spectrum band for transmission of an uplink message based at least in part on the downlink control message and means for receiving at least one uplink message on the frequency resources during the first TxOP or a second TxOP based at least in part the downlink control message.

A further apparatus is described. The apparatus may include a processor, memory in electronic communication with the processor, and instructions stored in the memory. The instructions may be operable to cause the processor to transmit a downlink control message during a first TxOP, identify frequency resources of a shared radio frequency spectrum band for transmission of an uplink message based at least in part on the downlink control message and receive at least one uplink message on the frequency resources during the first TxOP or a second TxOP based at least in part the downlink control message.

A non-transitory computer readable medium for wireless communication is described. The non-transitory computer-readable medium may include instructions to cause a processor to transmit a downlink control message during a first TxOP, identify frequency resources of a shared radio frequency spectrum band for transmission of an uplink message based on the downlink control message and receive at least one uplink message on the frequency resources during the first TxOP or a second TxOP based at least in part the downlink control message.

Some examples of the method, apparatus, or non-transitory computer-readable medium described above may further include processes, features, means, or instructions for selecting a DCI format of the downlink control message. Some examples of the method, apparatus, or non-transitory computer-readable medium described above may further include processes, features, means, or instructions for determining to receive the at least one uplink message during the first TxOP or the second TxOP based on the DCI format of the downlink control message.

Some examples of the method, apparatus, or non-transitory computer-readable medium described above may further include processes, features, means, or instructions for configuring an indicator in DCI of the downlink control message. Some examples of the method, apparatus, or non-transitory computer-readable medium described above may further include processes, features, means, or instructions for determining a timing offset for the at least one uplink message based on the indicator.

Some examples of the method, apparatus, or non-transitory computer-readable medium described above may further include processes, features, means, or instructions for configuring an indicator in DCI of the downlink control message. Some examples of the method, apparatus, or non-transitory computer-readable medium described above may further include processes, features, means, or instructions for determining a duration of uplink transmissions based on the indicator.

Some examples of the method, apparatus, or non-transitory computer-readable medium described above may further include processes, features, means, or instructions for configuring an indicator in DCI of the downlink control message. Some examples of the method, apparatus, or non-transitory computer-readable medium described above may further include processes, features, means, or instructions for determining to receive the at least one uplink message during the first TxOP or the second TxOP based on the indicator in the DCI.

Some examples of the method, apparatus, or non-transitory computer-readable medium described above may further include processes, features, means, or instructions for configuring a timing relationship between the downlink control message and an uplink triggering message. Some examples of the method, apparatus, or non-transitory computer-readable medium described above may further include processes, features, means, or instructions for transmitting the uplink triggering message according to the timing relationship.

DETAILED DESCRIPTION

Figure 1:
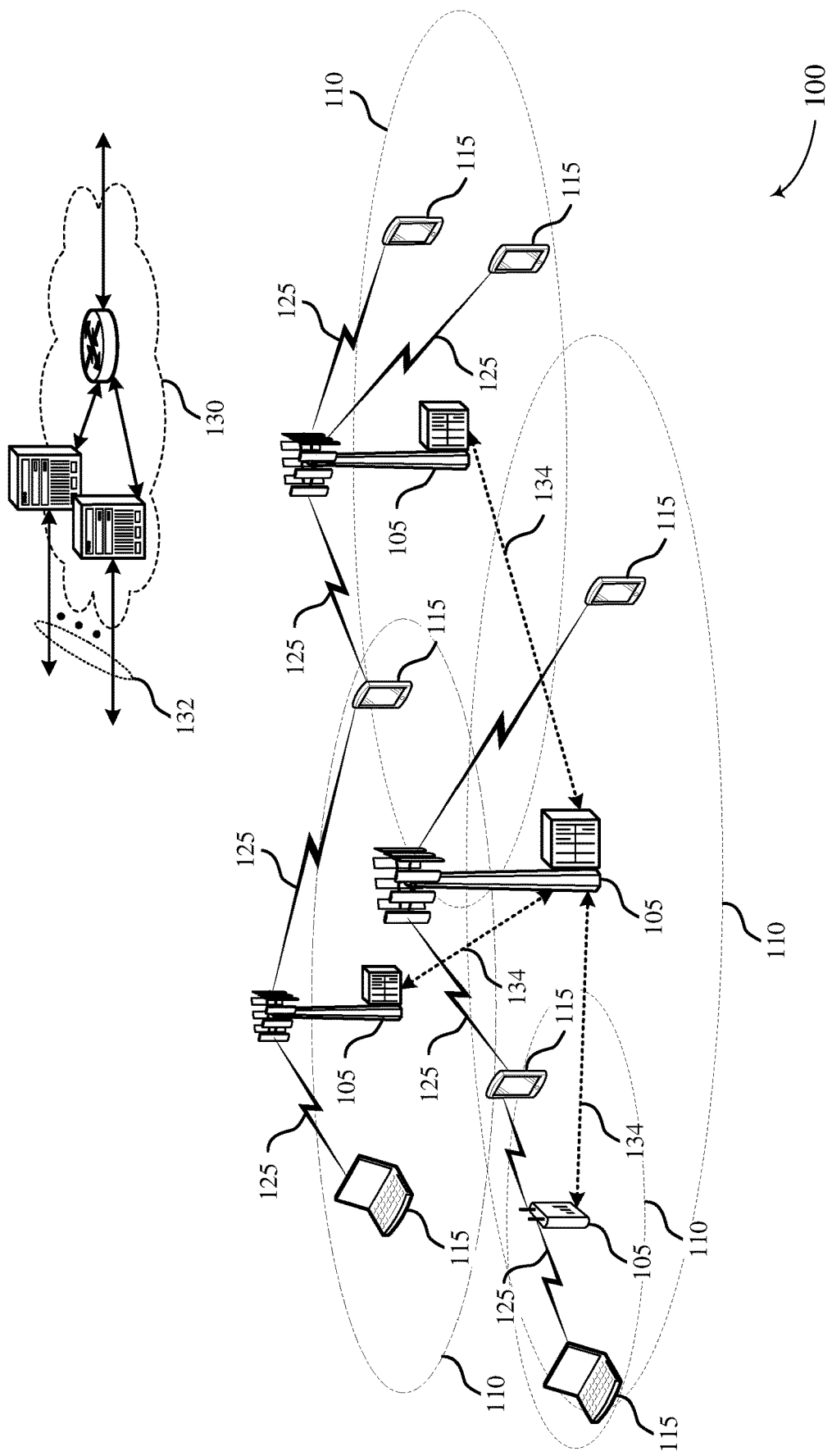
FIG. 1 illustrates an example of a wireless communications system that supports uplink payload determination and uplink grant indication for MulteFire in accordance with aspects of the present disclosure.

The present disclosure provides techniques for uplink (UL) scheduling and payload size selection in a shared radio frequency spectrum band. Because the wireless medium is shared, it may not be available for transmissions at all times, so conveying control information or control channel formatting information may be difficult or unreliable. A user equipment (UE) may thus transmit certain control information using unscheduled uplink control messages. The information included in these messages may vary, as described below, so the payload size may vary. The UE and a base station may thus be configured to determine the payload size—independently, in some case—to allow for efficient and reliable uplink communication. Additionally, information about assigned resources may be conveyed using particular downlink formats or with information included in downlink control information (DCI). This may allow a UE to determine whether assigned resources are to be used during a current or subsequent transmission opportunity (TxOP), which may be of importance given the relative uncertainty of operating in the shared medium.

By way of example, a shared radio frequency spectrum band may be used for LTE/LTE-A communications and may be shared with devices that operate according to different radio access technologies (RATs), such as Wi-Fi devices that operate according to IEEE 802.11 standards, for example. The shared radio frequency spectrum band may be used in combination with, or independent from, a licensed radio frequency spectrum band. The licensed radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may contend for access using listen before talk (LBT) procedures (e.g., a radio frequency spectrum band that is available for unlicensed use, such as Wi-Fi use, a radio frequency spectrum band that is available for use by different RATs, or a radio frequency spectrum band that is available for use by multiple operators in an equally shared or prioritized manner).

The present disclosure provides techniques for uplink (UL) scheduling and payload size selection in a shared radio frequency spectrum. Uplink transmissions may include data (e.g., physical uplink shared channel (PUSCH)) or control information (e.g., a physical uplink control channel (PUCCH)). The PUCCH payload size may vary, as it may depend on a number of factors, including feedback, bandwidth, channel state information (CSI), among other factors. A UE may select a payload size from a set of predetermined sizes. The base station may determine the same payload size or it may blindly detect the payload size upon receiving the UL transmission. Or, the base station may indicate the payload size to the UE.

The UL grants issued to the UE may take multiple forms (e.g., different downlink control indicator formats) and may grant transmissions for the same or different transmission opportunities as well as one or multiple subframes. In one example, two grant types may be used. A first type may schedule an UL transmission in another transmission opportunity and another may schedule multiple UL subframes within the same transmission opportunity. In some cases, the UL transmission may be sent after some delay from receiving the UL grant, where the delay may be signaled to the UE. In other cases, the delay may be variable and the UL transmission may occur after the UE has received a trigger.

In another example of UL grant type, single or multiple subframe grants for a same or different transmission opportunity may be provided. For example, the starting offset and the duration of UL transmissions may be signaled to the UE. Additionally, a flag may be signaled that indicates if the grant is for a same transmission opportunity or a different transmission opportunity.

In some examples of the grants for different transmission opportunities, a bit may indicate whether there is a fixed time relationship or a variable time relationship between the grant and the UL transmission. Also, depending on the value of this bit, the contents of the grant may be re-interpreted. In some examples, the UL transmission may be triggered after an initial waiting period, where the waiting period may be explicitly signaled in the grant or may be inferred by the UE based on a number of factors.

Aspects of the disclosure introduced above are described herein in the context of a wireless communication system. UL scheduling for current and later transmission opportunities, as well as UL payload determination, are described. Aspects of the disclosure are further illustrated by and described with reference to apparatus diagrams, system diagrams, and flowcharts that relate to uplink payload determination and uplink grant indication for MulteFire.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network that operates using a shared radio frequency spectrum band. In some examples, an UE 115 may receive an uplink grant from a base station 105, where the uplink grant may schedule uplink subframes in the current or later transmission opportunities. In some examples, wireless communications system 100 may include an LTE/LTE-A network, a MulteFire network, a neutral host small cell network, or the like, operating with overlapping coverage areas.

A MulteFire network may include access points (APs) and/or base stations 105 communicating in an unlicensed radio frequency spectrum band, e.g., without a licensed frequency anchor carrier. For example, the MulteFire network may operate without an anchor carrier in the licensed spectrum. Wireless communications system 100 may support frame structure signaling, which may, e.g., increase the efficiency of MulteFire communications within system 100. In a MulteFire network, UEs 115 and base stations 105 may contend for access to frequency band with other devices and networks. Thus, UEs 115 and base stations 105 may perform clear channel assessment (CCA) procedures, and may transmit during dynamically determined transmission opportunities (TxOPs).

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device, etc. A UE 115 may determine a payload size for unscheduled uplink control messages; such determinations may be autonomous or independent of a base station 105.

Base stations 105 may communicate with the core network 130 and with one another. For example, base stations 105 may interface with the core network 130 through backhaul links 132 (e.g., Si, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNB s) 105. Among other operations, base stations 105, may determine payload size information for uplink control messages; or base stations 105 may configure downlink control messages to convey information accounting for cross-TxOP scenarios.

In some cases, a UE 115 or base station 105 may operate in a shared or unlicensed frequency spectrum. These devices may perform a clear channel assessment (CCA) prior to communicating in order to determine whether the channel is available. A CCA may include an energy detection procedure to determine whether there are any other active transmissions. For example, the device may infer that a change in a received signal strength indication (RSSI) of a power meter indicates that a channel is occupied. Specifically, signal power that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence.

The communication links 125 between base stations 105 and UEs 115 may utilize unlicensed frequency spectrum and these resources may be divided in the time domain into radio frames. As described below, a radio frame may include both downlink and uplink portions, and a radio frame may include a special subframe, or portion that supports a transition from downlink to uplink. A radio frame or group of downlink and uplink time periods may be referred to as a transmission opportunity. Each transmission opportunity may include a special subframe, and UEs 115 may exploit the special subframe for unscheduled transmissions to the base station 105. For example, a UE 115 may send HARQ feedback during a special subframe.

Hybrid Automatic Repeat Request (HARQ) may be a method of ensuring that data is received correctly over a wireless communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be useful in poor conditions. In other cases, redundancy bits are not added to each transmission, but are retransmitted after the transmitter of the original message receives a negative acknowledgement (NACK) indicating a failed attempt to decode the information. The chain of transmission, response and retransmission may be referred to as a HARQ process. In some cases, a limited number of HARQ processes may be used for a given communication link 125. In system 100, HARQ feedback information may be provided in an uplink message along with other uplink control information (UCI), so the payload of an uplink message may be determined accordingly.

A base station 105 may gather channel condition information from a UE 115 in order to efficiently configure and schedule the channel. This information may be sent from the UE 115 in the form of a channel state report. A channel state report may contain an rank indicator (RI) requesting a number of layers to be used for DL transmissions (e.g., based on the antenna ports of the UE 115), a precoding matrix indicator (PMI) indicating a preference for which precoder matrix should be used (based on the number of layers), and a channel quality indicator (CQI) representing the highest modulation and coding scheme (MCS) that may be used under current channel conditions. CQI may be calculated by a UE 115 after receiving predetermined pilot symbols such as cell-specific reference signals (CRS) or CSI-RS. RI and PMI may be excluded if the UE 115 does not support spatial multiplexing (or is not in spatial multiplexing support mode). The types of information included in the report determines a reporting type. Channel state reports may be periodic or aperiodic. That is, a base station 105 may configure a UE 115 to send periodic reports at regular intervals, and may also request additional reports as needed. Aperiodic reports may include wideband reports indicating the channel quality across an entire cell bandwidth, UE selected reports indicating a subset of the best subbands, or configured reports in which the subbands reported are selected by the base station 105.

In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

Physical downlink control channel (PDCCH) carries downlink control information (DCI) in at least one control channel element (CCE), which may consist of nine logically contiguous resource element groups (REGs), where each REG contains 4 resource elements (REs). DCI includes information regarding DL scheduling assignments, UL resource grants, transmission scheme, UL power control, HARQ information, MCS and other information. The size and format of the DCI messages can differ depending on the type and amount of information that is carried by the DCI. For example, if spatial multiplexing is supported, the size of the DCI message is large compared to contiguous frequency allocations. Similarly, for a system that employs multiple input multiple output (MIMO), the DCI may include additional signaling information. DCI size and format depend on the amount of information as well as factors such as bandwidth, the number of antenna ports, and duplexing mode. PDCCH can carry DCI messages associated with multiple users, and each UE 115 may decode the DCI messages that are intended for it. For example, each UE 115 may be assigned a cell radio network temporary identity (C-RNTI) and cyclic redundancy check (CRC) bits attached to each DCI may be scrambled based on the C-RNTI. System 100 may support a common physical downlink control channel (C-PDCCH), which may provide information about TxOPs or it may trigger transmissions on previously assigned resources.

Figure 2:
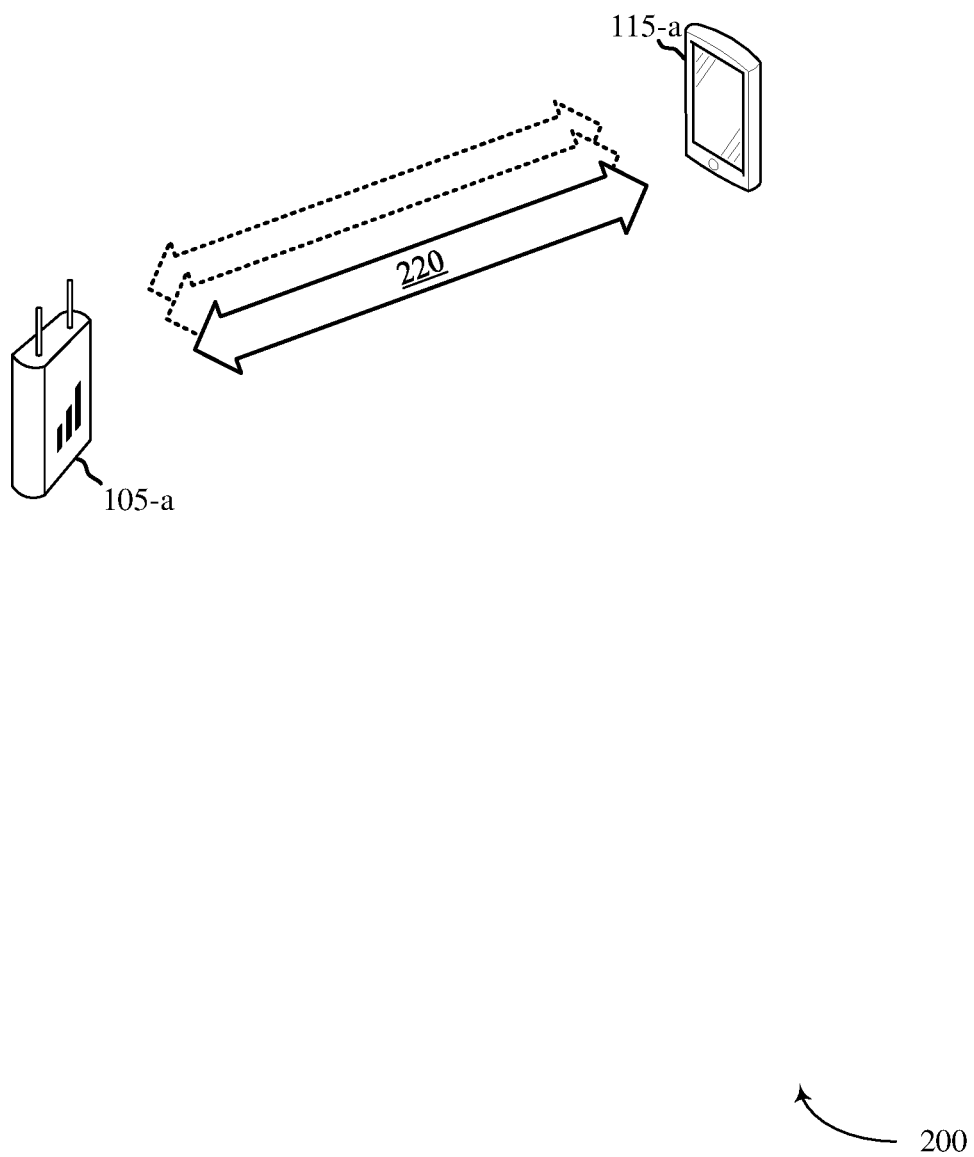
FIG. 2 illustrates an example of a wireless communications system that supports uplink payload determination and uplink grant indication for MulteFire in accordance with aspects of the present disclosure.

FIG. 2 illustrates an example of a wireless communications system 200 that supports uplink payload determination and uplink grant indication for MulteFire. Wireless communications system 200 may include base station 105-a and UE 115-a, which may be examples of the corresponding devices described with reference to FIG. 1. In some examples, UE 115-a may receive an uplink grant from a base station 105-a, where the uplink grant may schedule uplink subframes in the current or later transmission opportunities. In some examples, wireless communications system 200 may include an LTE/LTE-A network, a MulteFire network, a neutral host small cell network, or the like.

In some examples of the wireless communication system 200, base station 105-a and UE 115-a may communicate using communications link 220, which may provide for both uplink and downlink communications. The communications link 220, in some examples, may transmit waveforms between the base station 105-a and the UE 115-a using one or more component carriers that may include OFDMA waveforms, SC-FDMA waveforms, or resource block interleaved FDMA waveforms, for example. The communications link 220 may be associated with a frequency in the shared radio frequency spectrum band. This example is presented for illustrative purposes and there may be other similar modes of operation or deployment scenarios that provide LTE/LTE-A communication in a shared radio frequency spectrum band.

In some examples, one type of service provider that may benefit from the capacity offload offered by using LTE/LTE-A in a shared radio frequency spectrum band is a traditional mobile network operator (MNO) having access rights to an LTE/LTE-A licensed radio frequency spectrum band. In some examples, base station 105-a may be deployed in a residential, small business, medium business, or enterprise environment, and may allow UE 115-a to establish connections using shared radio frequency spectrum band(s). Such a deployment may allow UE 115-a to operate using shared radio frequency spectrum band and reduce data usage provided to the UE 115-a through licensed radio frequency spectrum bands, which may help reduce costs for a user of UE 115-a in some cases. In some examples, base station 105-a may include hardware for both licensed spectrum access as well as shared spectrum access.

During a radio frame, UE 115-a may receive information from base station 105-a on a downlink (DL) or may send information to base station 105-a or other mobile device on an uplink (UL). A radio frame may include both DL and UL portions, and a radio frame may include a special subframe, or a portion that supports a transition from downlink to uplink. Uplink transmissions may include data or control information. For example, data may be transmitted on the UL through the physical uplink shared channel (PUSCH). PUSCH transmissions may be grant-based (i.e., scheduled by base station 105-a) and may occur in the same transmission opportunity or over multiple transmission opportunities (a radio frame or group of downlink and uplink time periods may be referred to as a transmission opportunity). In addition to data, control information may be transmitted on the UL through a control channel, for example, a physical uplink control channel (PUCCH).

The PUCCH may take multiple forms. An enhanced or extended PUCCH (ePUCCH) may include resources from portions of several resource blocks. For example, ePUCCH may be interleaved with other transmissions within resource blocks. In some cases, ePUCCH transmissions from several UEs 115 may be interleaved within a set of resource blocks. In some examples, ePUCCH may be grant-based or trigger-based. That is, it may be scheduled or a UE may transmit ePUCCH after detecting a trigger.

Wireless communications system 200 may also use a shortened control channel, which may be referred to as a short-duration PUCCH or sPUCCH. An sPUCCH may use a similar interleave structure a ePUCCH but may include resources of a smaller number of resource blocks. For example, sPUCCH may use resource of four or fewer orthogonal frequency division multiplexing (OFDM) symbols and may be used to transmit uplink control information.

The sPUCCH may be trigger-based, which may improve flexibility among transmissions between UE 115-a and base station 105-a. For example, fixed scheduling (e.g., sending HARQ four subframes after receiving a DL) may be eliminated through the use of triggers. Since the triggers may be dynamically sent, the transmissions between UE 115-a and eNB may be more efficiently configured, thus improving throughput.

The PUCCH payload size may vary. For example, the PUCCH payload size may depend on the number of component carriers to be acknowledged by the PUCCH, the number of HARQ processes, the number of bits needed to convey channel state information (CSI), the UL or DL bandwidth (e.g., fewer resource blocks may be associated with decreasing bandwidth), the ACK/NACK and CSI multiplexing scenarios, or UE 115-a's coverage range (e.g., if UE 115-a is at the cell center or cell edge). In some cases, the PUCCH payload size may be specified by the grant, for example, base station 105-a may determine and signal the ePUCCH payload size to UE 115-a. In other cases, however, the payload size may not be explicitly specified, e.g., in cases where the PUCCH is not grant-based (e.g., sPUCCH) and thus the payload size is not signaled to UE 115-a. In such cases, UE 115-a, base station 105-a, or both may need to know or determine the payload size in order to effectively communicate with each other.

In one example, multiple pre-defined payload sizes may be supported, for example, payload sizes of 10, 30, and 100 bits, although other sizes are possible. In a first case, UE 115-a may choose the payload size based on a set of rules. For example, the set of rules may be a function of the previously listed parameters that affect the PUCCH payload size (number of component carriers, number of HARQ processes, number of bits for CSI, UL/DL system bandwidth, multiplexing scenarios, UE coverage range, among others). Base station 105-a may be aware of the same rules and parameters and, through its own configuration, may choose the same payload size. That is, both UE 115-a and base station 105-a may choose a payload size based on the set of parameters.

In another case, UE 115-a may choose a payload size and base station 105-a may determine the payload size through blind detection. UE 115-a may or may not use a set of rules to determine the payload size. As such, base station 105-a may not determine the payload size before receiving the PUCCH—rather, upon receiving, it blindly detects the payload size. In some cases, UE 115-a may determine the total number of bits needed for the PUCCH and may choose a pre-defined payload size, for example, the next largest payload size relative to the total number of bits.

In yet another case, base station 105-a may indicate the payload size in the PUCCH trigger transmitted on common physical downlink control channel (C-PDCCH) so that payload sizes may be signaled to a group of UEs in the C-PDCCH. For example, the C-PDCCH may indicate the subframe type, such as regular, periodic, or special subframes, and may additionally indicate the payload size. In some cases, the trigger may be common to multiple UEs but the payload size may be signaled per UE. In other examples, however, individual payload signaling may occupy too many resources and a single payload size may be signaled to a group of UEs in the C-PDCCH. In such cases, the payload size may depend on UE 115-a with the largest PUCCH payload of the group—that is, base station 105-a may determine the largest payload within the group of UEs and may select a payload to accommodate the largest payload.

Figure 3:
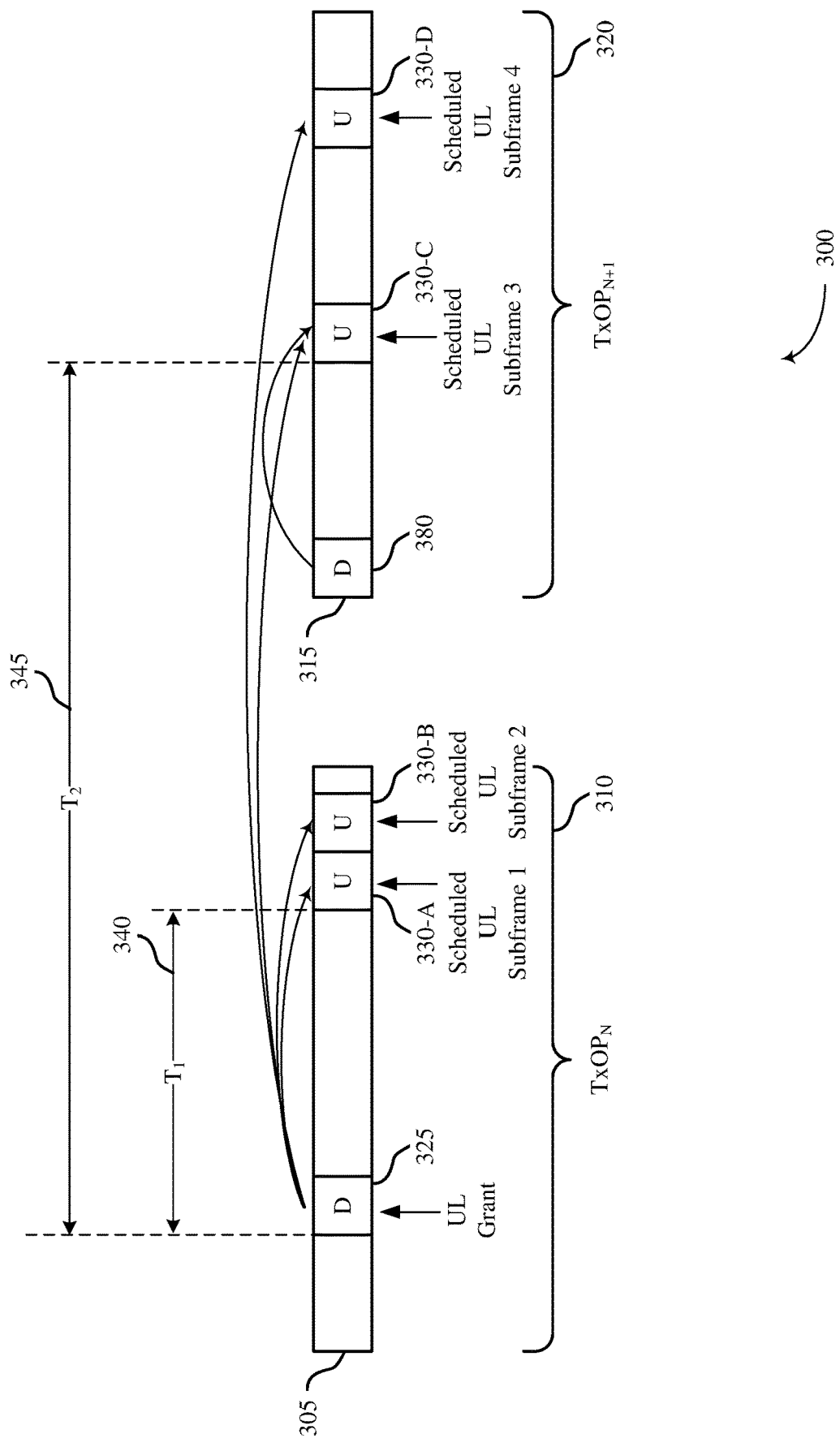
FIG. 3 illustrates an example of communications using multiple radio frames in which multiple uplink grants may be provided for uplink resources in a same or subsequent transmission opportunity (TxOP) that supports uplink payload determination and uplink grant indication for MulteFire in accordance with aspects of the present disclosure.

FIG. 3 illustrates an example of communications 300 using multiple radio frames in which multiple uplink grants may be provided for uplink resources in a same or subsequent TxOP. In some cases, communications 300 may represent aspects of techniques performed by a UE 115 or base station 105 as described with reference to FIGS. 1-2.

In the example of FIG. 3, a first radio frame 305 may be transmitted between a UE (e.g., UE 115 of FIGS. 1-2) and a base station (e.g., base station 105 of FIGS. 1-2) during a first TxOP 310, and a second radio frame 315 may be transmitted between the UE and the base station during a second TxOP 320. Within the radio frame 305, a downlink subframe 325 may include an uplink grant that provides uplink resources, which may include uplink subframes 330-a, 330-b, 330-c, and 330-d. In the example of FIG. 3, uplink subframe 330-a and 330-b are in the first radio frame 305 in the first TxOP 310, and the uplink subframes 330-c and 330-d are in the second radio frame 315 in the second TxOP 320. In some examples, time period $T_1$ 340 may be provided such that the UL transmission is sent time period $T_1$ 340 after downlink subframe 325. In some examples, an UL transmission may occur after receiving trigger 380 from the base station.

Transmission opportunities 310 and 320 may include various subframe types, such as regular, periodic, or special subframes, and the PUCCH transmissions, which may occupy 1-4 OFDM symbols, may be sent in the various subframe types. In one case, the UE transmits sPUCCH after receiving trigger 380, where trigger 380 may indicate which subframe type the sPUCCH is to be transmitted and may, in some cases, include an explicit signal to transmit sPUCCH. In some examples, trigger 380 may also include additional information, such as the payload size of the PUCCH, as discussed above.

In another case, sPUCCH may be transmitted in special subframes (e.g., a subframe that allows switching from downlink to uplink scheduling, or vice versa). Or, in another case, sPUCCH may be transmitted in periodic UL subframes, which, in some cases, may be referred to as anchor subframes. The periodic UL subframes may be used for physical random access channel (PRACH) transmissions and may occupy four OFDM symbols but, in some cases, sPUCCH may be transmitted instead. In such cases, the base station may be configured to look for such transmissions from the UE during the periodic UL subframes. In other cases, sPUCCH may not be transmitted on UL subframes if it may block potential listen before talk (LBT) operations of other UEs, which may occur for regular UL subframes.

The UL grants issued to the UE may take multiple forms. In one case, UL grant 325 may be for a single subframe and the same transmission opportunity. For example, UL grant 325 may schedule UL subframe 330-a, which is in the same TxOP (TxOP 310) as UL grant 325. In some cases, a fixed time relationship, such as time period $T_1$ 340, may exist between UL grant 325 and UL subframe 330-a (e.g., a grant is received at subframe N and transmission occurs at subframe N+4).

In another case, two grant types may be used. A first type may schedule an UL transmission in another transmission opportunity (cross-TxOP grant). For example, UL grant 325 may schedule UL subframe 330-c or 330-d, which are in TxOP 320. A fixed time relationship may still exist but the delay may be longer. For example, UE 115-a may receive UL grant 325 at subframe N and transmission may occur at subframe $N+T_2$, where time period $T_2$ 345 is variable and may be signaled to the UE—for example, UL grant 325 may contain time period $T_2$ 345. In other instances, there may be a variable time relationship that depends on a trigger such that the transmission occurs after receiving trigger 380. The delay, time period $T_2$ 345, a variable time period that may be a function of UE's receiving of the trigger, may still be used in such situations—in other words, transmission would occur at subframes after $N+T_2$ for a grant received during subframe N.

The second grant type may grant transmissions for the same transmission opportunity but for multiple subframes. For example, UL grant 325 may schedule UL subframes 330-a and 330-b, which are in the same TxOP 310 as UL grant 325. Here, the offset (time period $T_1$ 340) and length of transmission may be signaled for each UE. Each of the grant types may represent a new DCI format (e.g., two new DCI formats). In some examples, the single subframe case may be subsumed by indicating the subframe length of the grant to be '1.'

In another case, another grant type may issue single or multiple subframe grants for a same or different transmission opportunity. For example, UL grant 325 may schedule UL subframes 330-a, 330-b, which are in TxOP 310, and UL subframes 330-c and 330-d, which are in TxOP 320. This grant type may also represent a new DCI. In this case, the starting offset (time period $T_1$ 340) and the duration of UL transmissions may be signaled to the UE and may apply to both TxOP 310 and TxOP 320. In some cases, base station 105-a may also signal a flag that indicates if the grant is for a same transmission opportunity or a different transmission opportunity (e.g., a bit of '0' or '1')—thus, a single grant type may grant an UL transmission for the current or a different transmission opportunity.

In some examples where UL grant 325 grants UL transmission for different transmission opportunities, a bit may indicate whether there is a fixed time relationship or a variable time relationship between the grant and the UL transmission. In some cases, depending on the value of this bit, the contents of UL grant 325 may be re-interpreted. For example, the time offset at which the UL transmission is supposed to occur may be re-interpreted such that if the UE determines it is a variable time relationship, it may wait until it receives trigger 380.

If UL grant 325 is a cross-TxOP grant, the transmission may be triggered after an initial waiting period, base station 105-a may determine. In one example, base station 105-a may explicitly signal the initial waiting period to the UE 115-a in UL grant 325. In another example, the initial waiting period may be inferred from either the UL burst length or the transmission opportunity that may be signaled to the UE through frame structure signal (e.g., using C-PDCCH). For example, UL grant 325 may indicate whether it is meant for the same (TxOP 310) or different transmission opportunity (e.g., TxOP 320). Base station 105-a may signal such indication using the flag as discussed above. If the UL grant 325 is meant for the same transmission opportunity, the transmission may be sent relative to first UL of the upcoming UL burst within the same transmission opportunity (TxOP 310). On the other hand, if the UL grant 325 is meant for a different transmission opportunity (e.g., TxOP 320), the transmission may be sent relative to the next trigger subframe of the different transmission opportunity (e.g., TxOP 320) that occurs after the current UL burst is over. In some cases, the frame structure signaling may include the UL burst length, the transmission opportunity length, or both.

Figure 4:
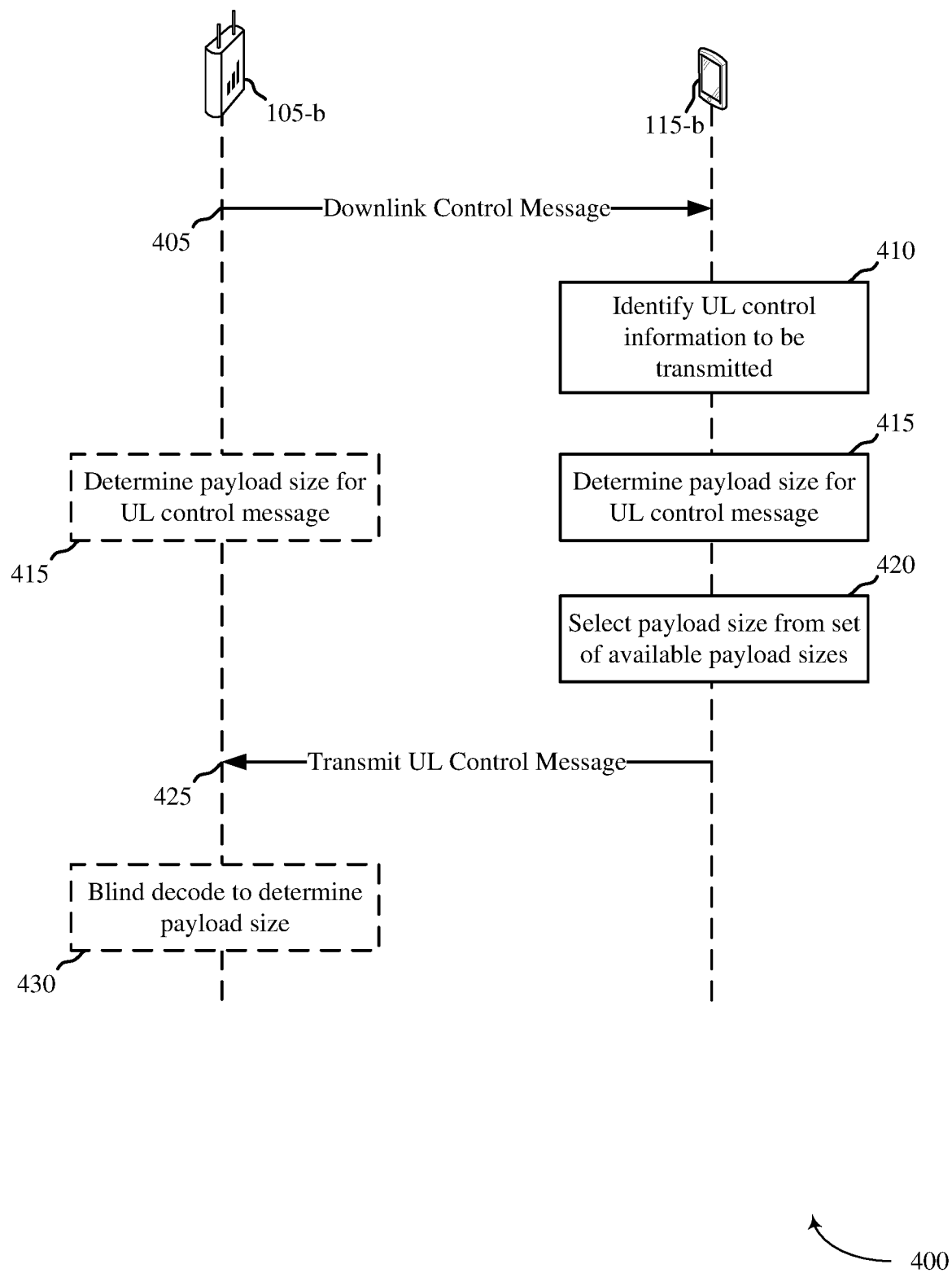
FIG. 4 illustrates an example of a process flow in a system that supports uplink payload determination and uplink grant indication for MulteFire in accordance with aspects of the present disclosure.

FIG. 4 illustrates an example of a process flow 400 for uplink payload determination for MulteFire. In some cases, process flow 400 may represent aspects of techniques performed by a UE 115 or base station 105 as described with reference to FIGS. 1-2. UE 115-b may select an UL payload size from predetermined sizes and then transmit its payload to base station 105-b.

At 405, UE 115-b may receive a common downlink control message that includes an indication of available uplink frequency resources of a shared radio frequency spectrum band. In some examples, the indication of available uplink frequency resources is an indication of a subframe type. The available uplink frequency resources may, in some cases, be associated with a special subframe that includes resources designated for both uplink and downlink communication. In some cases, the available uplink frequency resources may be associated with a periodic uplink subframe. In some examples, the periodic uplink subframe may be designated for random access transmissions. In some cases, the common downlink control message also includes an indication of the payload size. The common downlink control message may also include a trigger for the unscheduled uplink control message and additional information associated with a format of the UCI to be included in the unscheduled uplink control message.

At 410, UE 115-b may identify the uplink control information (UCI) to be included in an unscheduled uplink control message based on a number of component carriers for which to acknowledge transmissions, a number of HARQ processes, a number of bits to convey channel state information (CSI), a system bandwidth, a UCI multiplexing scheme, or coverage range of UE 115-b.

At 415, UE 115-b may determine a payload size of the unscheduled uplink control message based at least in part on uplink control information (UCI) to be included in the unscheduled uplink control message. Also at 415, base station 105-b may determine the payload size for the UL control message. For example, both UE 115-b and base station 105-b may use a same set of rules to determine the payload size.

At 420, UE 115-b may select the payload size from a set of available payload sizes. In some cases, the payload size is selected based on the indication of the payload size received at step 405.

At 425, UE 115-*b* may transmit the unscheduled uplink control message with the payload size using the available uplink frequency resources. In some cases, the unscheduled uplink control message is transmitted using four or fewer modulation symbols associated with the available uplink frequency resources.

At 430, base station 105-*b* may identify a set of available payload sizes and blindly detect the payload size based on the set of available payload sizes. For example, it may not determine the payload size at step 415 and instead may blindly decode the UL control message of step 425 to determine the payload size.

Figure 5:
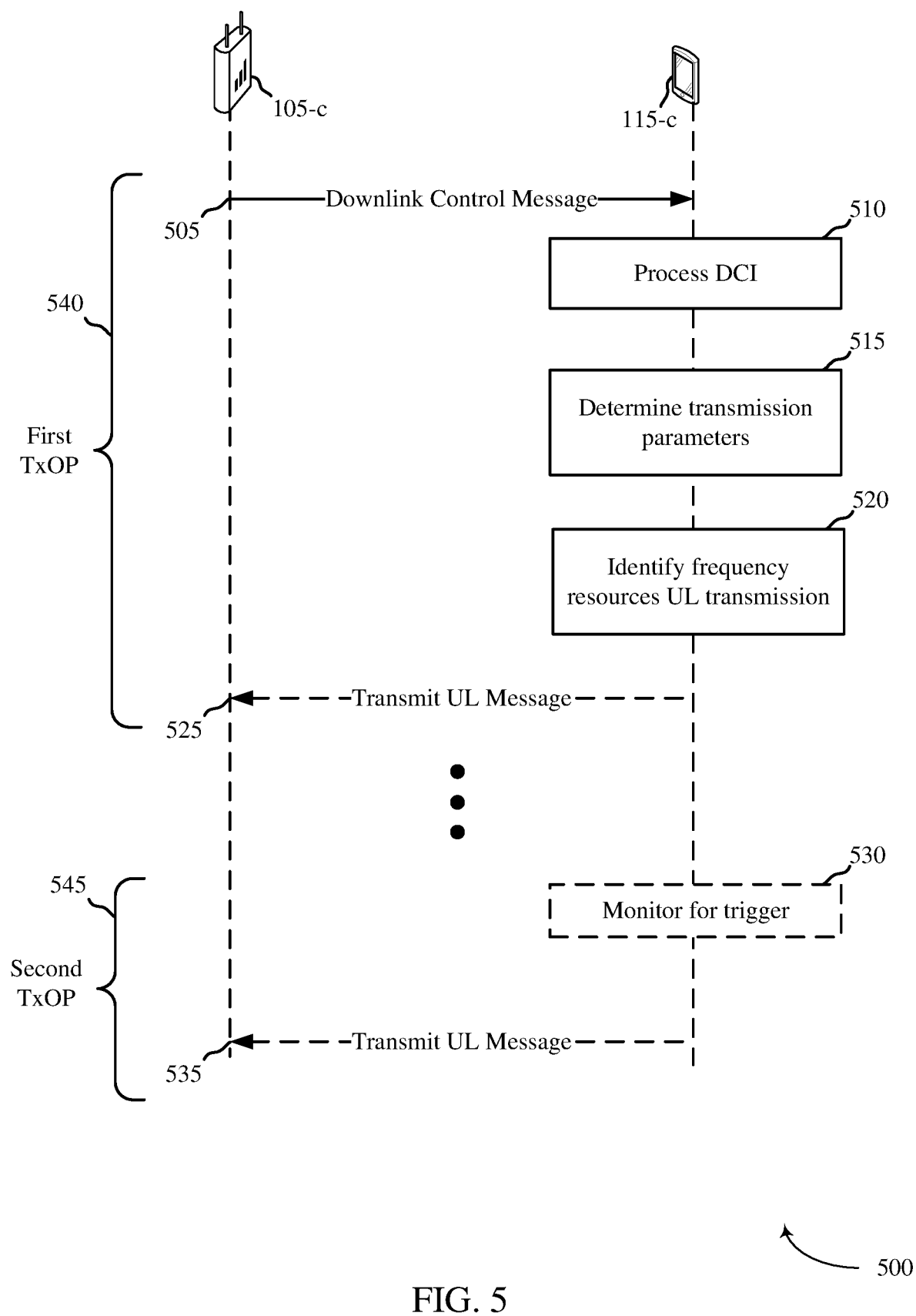
FIG. 5 illustrates an example of a process flow in a system that supports uplink payload determination and uplink grant indication for MulteFire in accordance with aspects of the present disclosure.

FIG. 5 illustrates an example of a process flow 500 uplink grant indication for MulteFire in accordance with aspects of the present disclosure. Process flow 500 may include base station 105-*a* and UE 115-*a*, which may be examples of the corresponding devices described with reference to FIG. 1-2.

At 505, UE 115-*c* may receive a downlink control message during a first transmission opportunity (TxOP) 540. For example, the downlink control message may be in the form of a PDCCH message, an ePDCCH message, or a C-PDCCH message.

At 510, UE 115-*c* may process the downlink control information (DCI) of the downlink control message. For example, UE 115-*c* may identify a DCI format. UE 115-*c* may also identify an indicator in the DCI of the downlink control message.

At 515, UE 115-*c* may determine transmission parameters. For example, UE 115-*c* may determine to transmit the at least one uplink message during the first TxOP 540 or the second TxOP 545 based on the DCI format of the downlink control message. Based on the indicator identified in step 510, UE 115-*c* may determine a timing offset for the at least one uplink message, determine a duration of uplink transmissions 525 or 535, or determine to transmit the at least one uplink message during the first TxOP 540 or the second TxOP 545.

In some examples of step 515, UE 115-*c* may determine a timing relationship between the at least one uplink message and the downlink control message based on the DCI in the downlink control message. In some examples, the timing relationship may be a fixed time relationship or a variable time relationship.

At 520, UE 115-*c* may identify frequency resources of a shared radio frequency spectrum band for transmission of an uplink message based at least in part on the downlink control message.

At 525, UE 115-*c* may transmit at least one uplink message on the frequency resources during the first TxOP 540 or a second TxOP 545 based at least in part on the downlink control message. For example, UE 115-*c* may transmit a plurality of uplink messages on the frequency resources during the first TxOP 540.

At 530, UE 115-*c* may monitor for an uplink triggering message according to a timing relationship. For example, UE 115-*c* may identify, at step 515, a timing relationship between the downlink control message and the uplink triggering message. In some cases, the timing relationship may be identified based on an explicit indication in the downlink control message of step 505. In other cases, the timing relationship may be inferred based on an uplink burst duration, a configuration of the first TxOP, or a configuration of the second TxOP.

At 535, UE 115-*c* may transmit at least one uplink message on the frequency resources during the second TxOP 545 based at least in part the downlink control message. For example, UE 115-*c* may transmit a plurality of uplink messages on the frequency resources during the second TxOP.

In some examples, prior to transmitting the downlink control message at 505, base station 105-*c* may select a DCI format of the downlink control message and determine to receive the at least one uplink message during the first TxOP or the second TxOP based on the DCI format of the downlink control message. Base station 105-*c* may also configure an indicator in the DCI of the downlink control message and determine a timing offset for the at least one uplink message based on the indicator and determine a duration of uplink transmissions based on the indicator. Base station 105-*c* may also configure an indicator in the DCI of the downlink control message and determine to receive the at least one uplink message during the first TxOP or the second TxOP based at least in part on the indicator in the DCI. In some cases, base station 105-*c* may configure a timing relationship between the downlink control message and an uplink triggering message and transmit the uplink triggering message according to the timing relationship.

Figure 6:
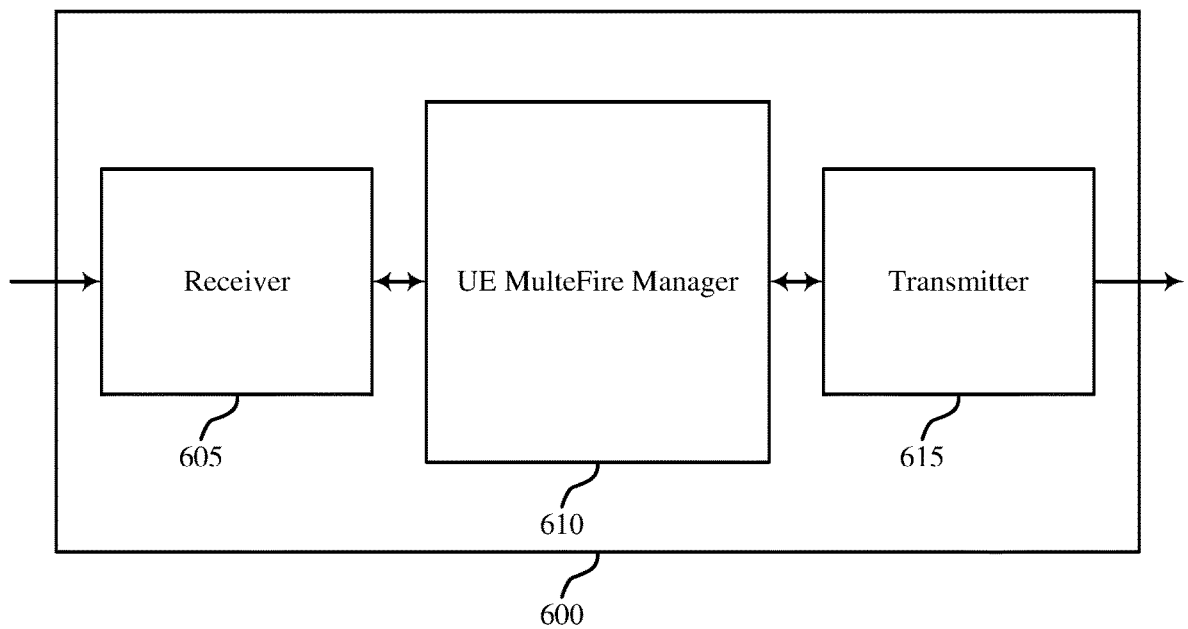
FIGS. 6 through 8 show block diagrams of a wireless device that supports uplink payload determination and uplink grant indication for MulteFire in accordance with aspects of the present disclosure.

FIG. 6 shows a block diagram of a wireless device 600 that supports uplink payload determination and uplink grant indication for MulteFire in accordance with aspects of the present disclosure. Wireless device 600 may be an example of aspects of a UE 115 described with reference to FIGS. 1 and 2. Wireless device 600 may include receiver 605, UE MulteFire manager 610 and transmitter 615. Wireless device 600 may also include a processor. Each of these components may be in communication with each other.

The receiver 605 may receive information such as packets, user data, or control information associated with various information channels (e.g., control channels, data channels, and information related to uplink payload determination and uplink grant indication for MulteFire, etc.). Information may be passed on to other components of the device. The receiver 605 may be an example of aspects of the transceiver 925 described with reference to FIG. 9.

The UE MulteFire manager 610 may receive a downlink control message during a first TxOP, identify frequency resources of a shared radio frequency spectrum band for transmission of an uplink message based on the downlink control message, and transmit at least one uplink message on the frequency resources during the first TxOP or a second TxOP based at least in part the downlink control message.

The UE MulteFire manager 610 may also receive a common downlink control message that includes an indication of available uplink frequency resources of a shared radio frequency spectrum band, determine a payload size of an unscheduled uplink control message based on UCI to be included in the unscheduled uplink control message, and transmit the unscheduled uplink control message with the payload size using the available uplink frequency resources. The UE MulteFire manager 610 may also be an example of aspects of the UE MulteFire manager 905 described with reference to FIG. 9.

The transmitter 615 may transmit signals received from other components of wireless device 600. In some examples, the transmitter 615 may be collocated with a receiver in a transceiver module. For example, the transmitter 615 may be an example of aspects of the transceiver 925 described with reference to FIG. 9. The transmitter 615 may include a single antenna, or it may include a plurality of antennas.

Figure 7:
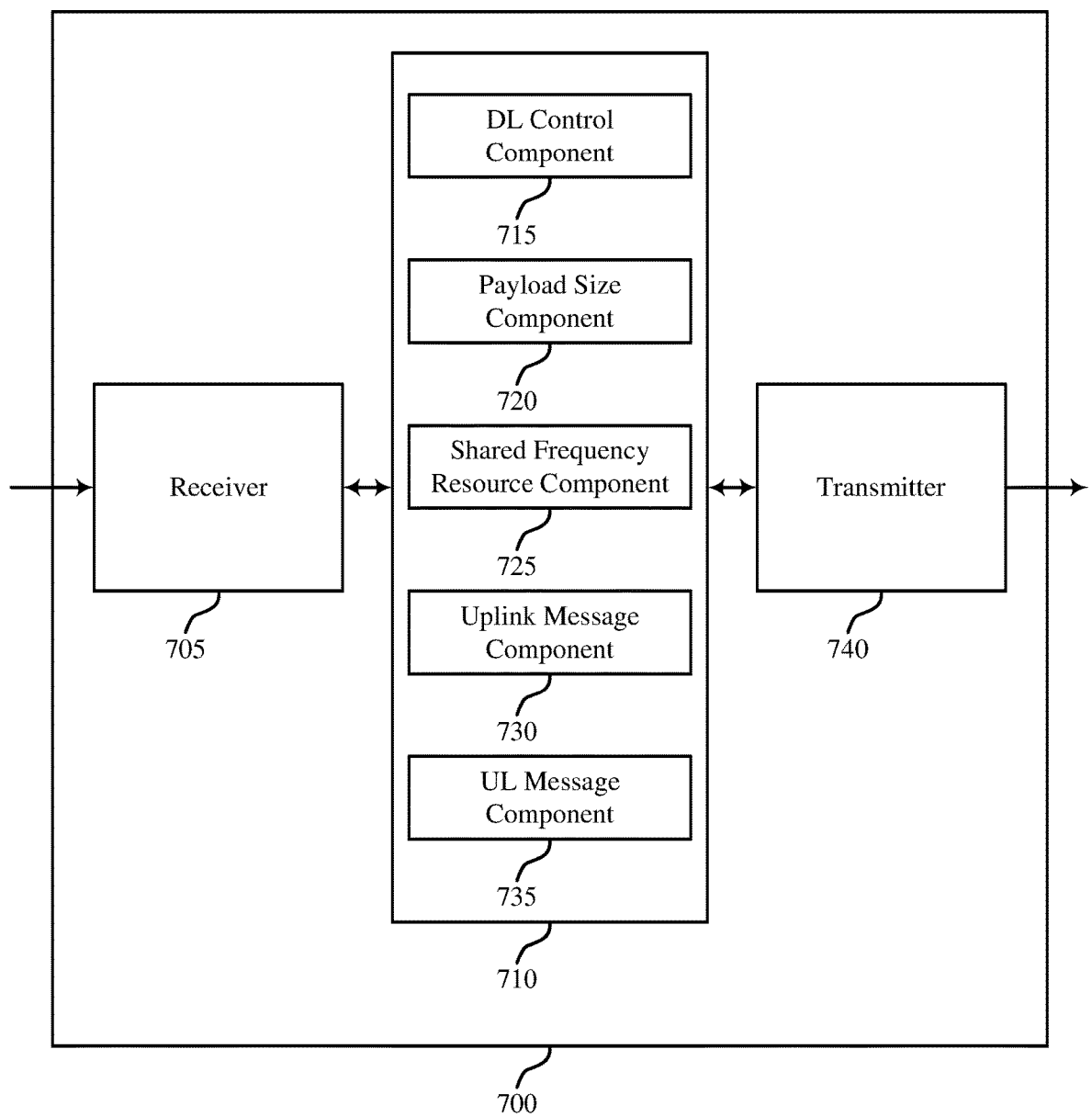

FIG. 7 shows a block diagram of a wireless device 700 that supports uplink payload determination and uplink grant indication for MulteFire in accordance with aspects of the present disclosure. Wireless device 700 may be an example of aspects of a wireless device 600 or a UE 115 described with reference to FIGS. 1, 2 and 6. Wireless device 700 may include receiver 705, UE MulteFire manager 710 and transmitter 740. Wireless device 700 may also include a processor. Each of these components may be in communication with each other.

The receiver 705 may receive information which may be passed on to other components of the device. The receiver 705 may also perform the functions described with reference to the receiver 605 of FIG. 6. The receiver 705 may be an example of aspects of the transceiver 925 described with reference to FIG. 9.

The UE MulteFire manager 710 may be an example of aspects of UE MulteFire manager 610 described with reference to FIG. 6. The UE MulteFire manager 710 may include DL control component 715, payload size component 720, shared frequency resource component 725, uplink message component 730 and UL message component 735. The UE MulteFire manager 710 may be an example of aspects of the UE MulteFire manager 905 described with reference to FIG. 9.

The DL control component 715 may receive a downlink control message during a first TxOP, and receive a common downlink control message that includes an indication of available uplink frequency resources of a shared radio frequency spectrum band. In some cases, the common downlink control message includes an indication of the payload size and the payload size is determined based on the indication. In some cases, the indication of available uplink frequency resources is an indication of a subframe type.

In some cases, the common downlink control message includes a trigger for the unscheduled uplink control message and additional information associated with a format of the UCI to be included in the unscheduled uplink control message. In some cases, the available uplink frequency resources are associated with a special subframe that includes resources designated for both uplink and downlink communication. In some cases, the available uplink frequency resources are associated with a periodic uplink subframe. In some cases, the periodic uplink subframe is designated for random access transmissions.

The payload size component 720 may determine a payload size of an unscheduled uplink control message based on UCI to be included in the unscheduled uplink control message. In some cases, determining the payload size of the unscheduled uplink control message comprises: selecting the payload size from a set of available payload sizes.

The shared frequency resource component 725 may identify frequency resources of a shared radio frequency spectrum band for transmission of an uplink message based on the downlink control message.

The uplink message component 730 may determine to transmit the at least one uplink message during the first TxOP or the second TxOP based on the indicator in the DCI, transmit a set of uplink messages on the frequency resources during the first TxOP, and transmit a set of uplink messages on the frequency resources during the second TxOP.

The UL message component 735 may transmit at least one uplink message on the frequency resources during the first TxOP or a second TxOP based at least in part the downlink control message, determine to transmit the at least one uplink message during the first TxOP or the second TxOP based on the DCI format of the downlink control message, and transmit the unscheduled uplink control message with the payload size using the available uplink frequency resources. In some cases, the unscheduled uplink control message is transmitted using four or fewer modulation symbols associated with the available uplink frequency resources.

The transmitter 740 may transmit signals received from other components of wireless device 700. In some examples, the transmitter 740 may be collocated with a receiver in a transceiver module. For example, the transmitter 740 may be an example of aspects of the transceiver 925 described with reference to FIG. 9. The transmitter 740 may utilize a single antenna, or it may utilize a plurality of antennas.

Figure 8:
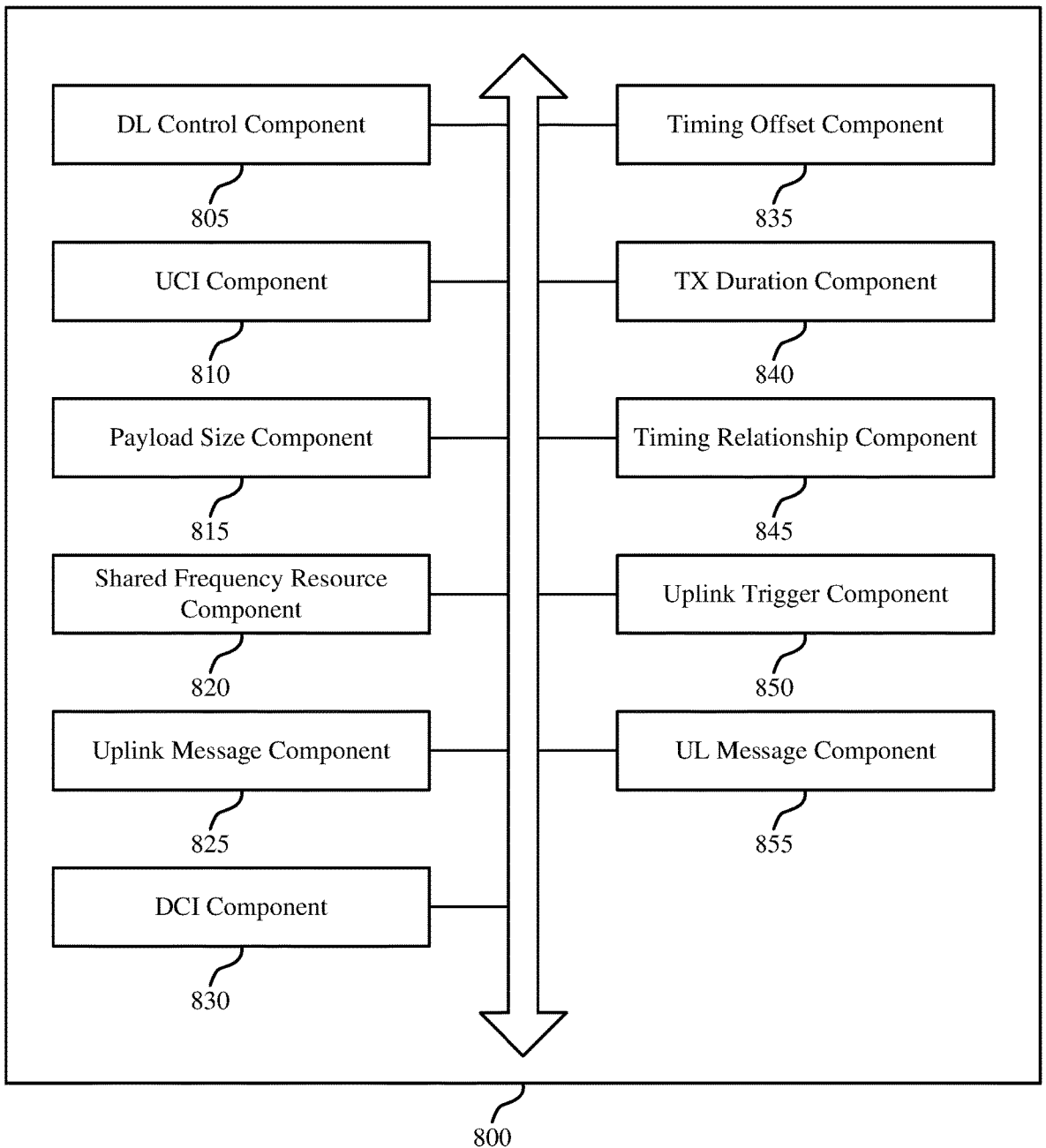

FIG. 8 shows a block diagram of a UE MulteFire manager 800 which may be an example of the corresponding component of wireless device 600 or wireless device 700. That is, UE MulteFire manager 800 may be an example of aspects of UE MulteFire manager 610 or UE MulteFire manager 710 described with reference to FIGS. 6 and 7. The UE MulteFire manager 800 may also be an example of aspects of the UE MulteFire manager 905 described with reference to FIG. 9.

The UE MulteFire manager 800 may include DL control component 805, UCI component 810, payload size component 815, shared frequency resource component 820, uplink message component 825, DCI component 830, timing offset component 835, TX duration component 840, timing relationship component 845, uplink trigger component 850 and UL message component 855. Each of these modules may communicate, directly or indirectly, with one another (e.g., via one or more buses).

The DL control component 805 may receive a downlink control message during a first TxOP, and receive a common downlink control message that includes an indication of available uplink frequency resources of a shared radio frequency spectrum band. In some cases, the common downlink control message includes an indication of the payload size and the payload size is determined based on the indication. In some cases, the indication of available uplink frequency resources is an indication of a subframe type.

In some cases, the common downlink control message includes a trigger for the unscheduled uplink control message and additional information associated with a format of the UCI to be included in the unscheduled uplink control message. In some cases, the available uplink frequency resources are associated with a special subframe that includes resources designated for both uplink and downlink communication. In some cases, the available uplink frequency resources are associated with a periodic uplink subframe. In some cases, the periodic uplink subframe is designated for random access transmissions.

The UCI component 810 may identify the UCI to be included in the unscheduled uplink control message based on a number of component carriers for which to acknowledge transmissions, a number of HARQ processes, a number of bits to CSI, a system bandwidth, a UCI multiplexing scheme, or a UE coverage range.

The payload size component 815 may determine a payload size of an unscheduled uplink control message based on UCI to be included in the unscheduled uplink control message. In some cases, determining the payload size of the unscheduled uplink control message comprises: selecting the payload size from a set of available payload sizes.

The shared frequency resource component 820 may identify frequency resources of a shared radio frequency spectrum band for transmission of an uplink message based on the downlink control message. The uplink message component 825 may determine to transmit the at least one uplink message during the first TxOP or the second TxOP based on the indicator in the DCI, transmit a set of uplink messages on the frequency resources during the first TxOP, and transmit a set of uplink messages on the frequency resources during the second TxOP.

The DCI component 830 may identify a downlink control information (DCI) format of the downlink control message, identify an indicator in DCI of the downlink control message, identify an indicator in DCI of the downlink control message, and identify an indicator in DCI of the downlink control message.

The timing offset component 835 may determine a timing offset for the at least one uplink message based on the indicator. The TX duration component 840 may determine a duration of uplink transmissions based on the indicator.

The timing relationship component 845 may determine a timing relationship between the at least one uplink message and the downlink control message based on DCI in the downlink control message, and identify a timing relationship between the downlink control message and an uplink triggering message. In some cases, the timing relationship is a fixed time relationship. In some cases, the timing relationship is a variable time relationship. In some cases, the timing relationship is identified based on an explicit indication in the downlink control message. In some cases, the timing relationship is inferred based on an uplink burst duration, a configuration of the first TxOP, or a configuration of the second TxOP.

The uplink trigger component 850 may monitor for the uplink triggering message according to the timing relationship. The UL message component 855 may transmit at least one uplink message on the frequency resources during the first TxOP or a second TxOP based at least in part the downlink control message, determine to transmit the at least one uplink message during the first TxOP or the second TxOP based on the DCI format of the downlink control message, and transmit the unscheduled uplink control message with the payload size using the available uplink frequency resources. In some cases, the unscheduled uplink control message is transmitted using four or fewer modulation symbols associated with the available uplink frequency resources.

Figure 9:
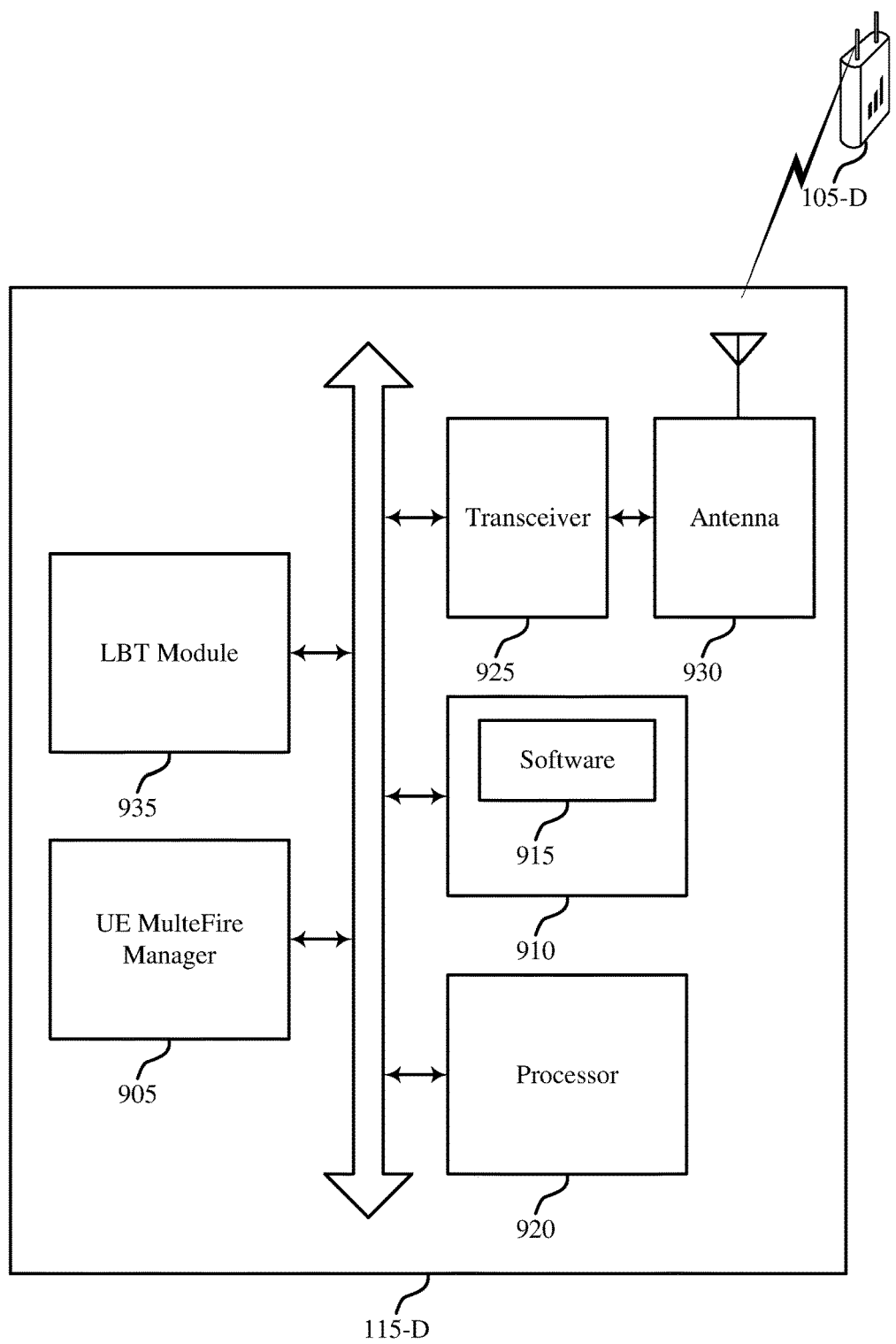
FIG. 9 illustrates a block diagram of a system including a UE that supports uplink payload determination and uplink grant indication for MulteFire in accordance with aspects of the present disclosure.

FIG. 9 shows a diagram of a system 900 including a device that supports uplink payload determination and uplink grant indication for MulteFire in accordance with aspects of the present disclosure. For example, system 900 may include UE 115-d, which may be an example of a wireless device 600, a wireless device 700, or a UE 115 as described with reference to FIGS. 1, 2 and 6 through 8.

UE 115-d may also include UE MulteFire manager 905, memory 910, processor 920, transceiver 925, antenna 930 and LBT module 935. Each of these modules may communicate, directly or indirectly, with one another (e.g., via one or more buses). The UE MulteFire manager 905 may be an example of a UE MulteFire manager as described with reference to FIGS. 6 through 8.

The memory 910 may include random access memory (RAM) and read only memory (ROM). The memory 910 may store computer-readable, computer-executable software including instructions that, when executed, cause the apparatus to perform various functions described herein (e.g., uplink payload determination and uplink grant indication for MulteFire, etc.). In some cases, the software 915 may not be directly executable by the processor but may cause a computer (e.g., when compiled and executed) to perform functions described herein. The processor 920 may include an intelligent hardware device, (e.g., a central processing unit (CPU), a microcontroller, an application specific integrated circuit (ASIC), etc.)

The transceiver 925 may communicate bi-directionally, via one or more antennas, wired, or wireless links, with one or more networks, as described above. For example, the transceiver 925 may communicate bi-directionally with a base station 105 or a UE 115. The transceiver 925 may also include a modem to modulate the packets and provide the modulated packets to the antennas for transmission, and to demodulate packets received from the antennas.

In some cases, the wireless device may include a single antenna 930. However, in some cases the device may have more than one antenna 930, which may be capable of concurrently transmitting or receiving multiple wireless transmissions.

Figure 10:
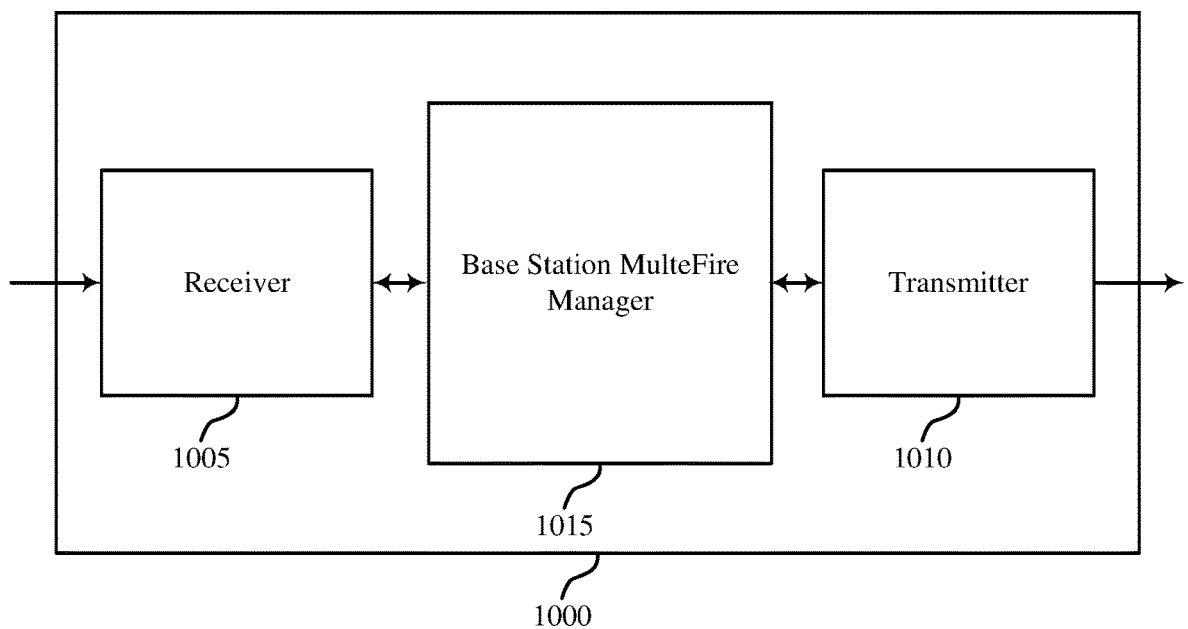
FIGS. 10 through 12 show block diagrams of a wireless device that supports uplink payload determination and uplink grant indication for MulteFire in accordance with aspects of the present disclosure.

FIG. 10 shows a block diagram of a wireless device 1000 that supports uplink payload determination and uplink grant indication for MulteFire in accordance with aspects of the present disclosure. Wireless device 1000 may be an example of aspects of a base station 105 described with reference to FIGS. 1 and 2. Wireless device 1000 may include receiver 1005, transmitter 1010 and base station MulteFire manager 1015. Wireless device 1000 may also include a processor. Each of these components may be in communication with each other.

The receiver 1005 may receive information such as packets, user data, or control information associated with various information channels (e.g., control channels, data channels, and information related to uplink payload determination and uplink grant indication for MulteFire, etc.). Information may be passed on to other components of the device. The receiver 1005 may be an example of aspects of the transceiver 1325 described with reference to FIG. 13.

The transmitter 1010 may transmit signals received from other components of wireless device 1000. In some examples, the transmitter 1010 may be collocated with a receiver in a transceiver module. For example, the transmitter 1010 may be an example of aspects of the transceiver 1325 described with reference to FIG. 13. The transmitter 1010 may include a single antenna, or it may include a plurality of antennas.

The base station MulteFire manager 1015 may transmit a common downlink control message that includes an indication of available uplink frequency resources of a shared radio frequency spectrum band, receive an unscheduled uplink control message using the available uplink frequency resources, and determine a payload size of an unscheduled uplink control message based on UCI included in the unscheduled uplink control message.

The base station MulteFire manager 1015 may also transmit a downlink control message during a first TxOP, identify frequency resources of a shared radio frequency spectrum band for transmission of an uplink message based on the downlink control message, and receive at least one uplink message on the frequency resources during the first TxOP or a second TxOP based at least in part the downlink control message. The base station MulteFire manager 1015 may also be an example of aspects of the base station MulteFire manager 1305 described with reference to FIG. 13.

Figure 11:
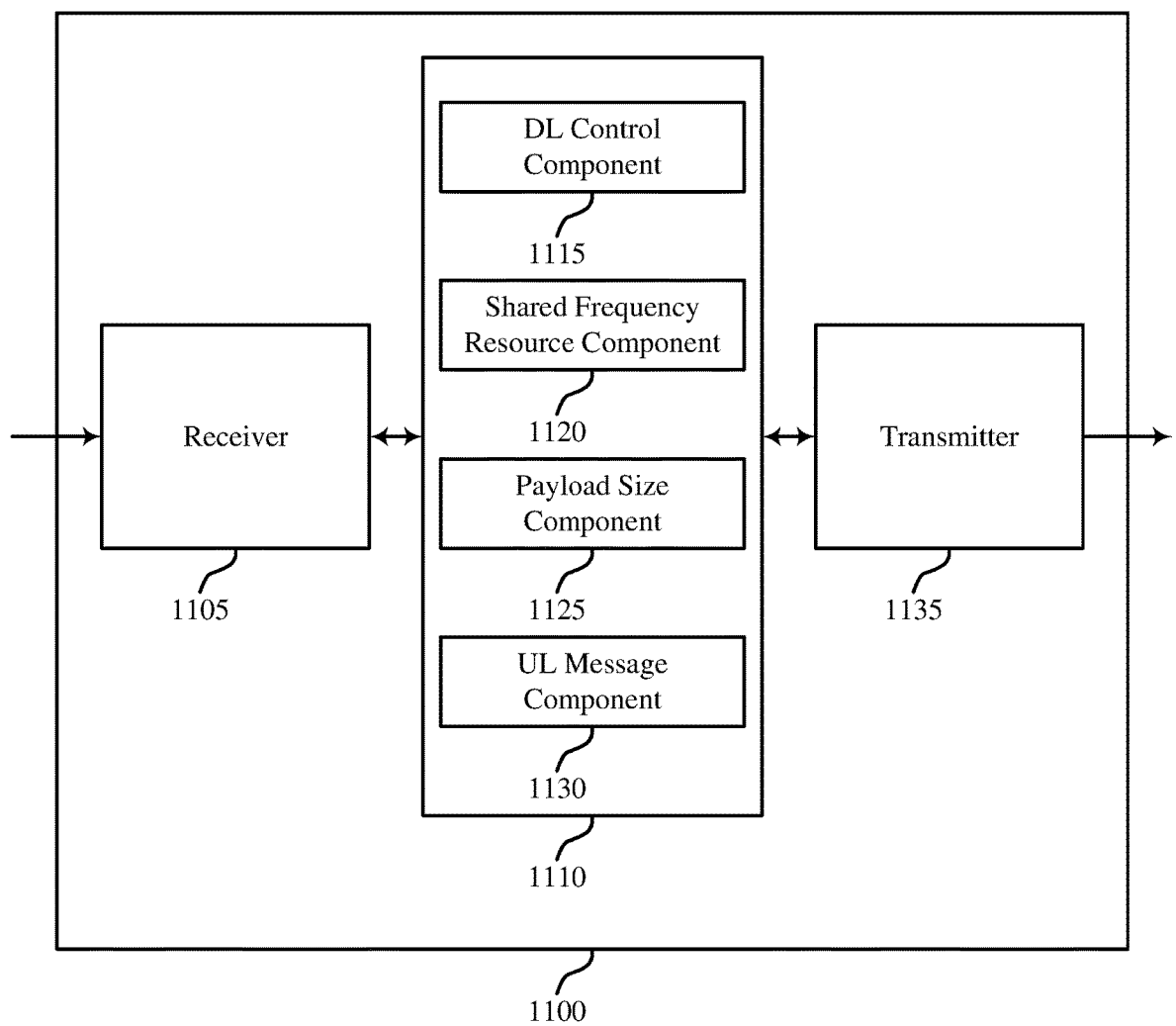

FIG. 11 shows a block diagram of a wireless device 1100 that supports uplink payload determination and uplink grant indication for MulteFire in accordance with aspects of the present disclosure. Wireless device 1100 may be an example of aspects of a wireless device 1000 or a base station 105 described with reference to FIGS. 1, 2 and 10. Wireless device 1100 may include receiver 1105, base station MulteFire manager 1110 and transmitter 1135. Wireless device 1100 may also include a processor. Each of these components may be in communication with each other.

The receiver 1105 may receive information which may be passed on to other components of the device. The receiver 1105 may also perform the functions described with reference to the receiver 1005 of FIG. 10. The receiver 1105 may be an example of aspects of the transceiver 1325 described with reference to FIG. 13.

The base station MulteFire manager 1110 may be an example of aspects of base station MulteFire manager 1015 described with reference to FIG. 10. The base station MulteFire manager 1110 may include DL control component 1115, shared frequency resource component 1120, payload size component 1125 and UL message component 1130. The base station MulteFire manager 1110 may be an example of aspects of the base station MulteFire manager 1305 described with reference to FIG. 13.

The DL control component 1115 may transmit a common downlink control message that includes an indication of available uplink frequency resources of a shared radio frequency spectrum band, and transmit a downlink control message during a first TxOP. In some cases, the common downlink control message includes an indication of the payload size and the payload size is determined based on the indication.

The shared frequency resource component 1120 may identify frequency resources of a shared radio frequency spectrum band for transmission of an uplink message based on the downlink control message. The payload size component 1125 may determine a payload size of an unscheduled uplink control message based on UCI included in the unscheduled uplink control message, and detect the payload size based on the set of available payload sizes. In some cases, determining the payload size comprises: identifying a set of available payload sizes.

The UL message component 1130 may receive an unscheduled uplink control message using the available uplink frequency resources, receive at least one uplink message on the frequency resources during the first TxOP or a second TxOP based at least in part the downlink control message, determine to receive the at least one uplink message during the first TxOP or the second TxOP based on the DCI format of the downlink control message, and determine to receive the at least one uplink message during the first TxOP or the second TxOP based on the indicator in the DCI.

The transmitter 1135 may transmit signals received from other components of wireless device 1100. In some examples, the transmitter 1135 may be collocated with a receiver in a transceiver module. For example, the transmitter 1135 may be an example of aspects of the transceiver 1325 described with reference to FIG. 13. The transmitter 1135 may utilize a single antenna, or it may utilize a plurality of antennas.

Figure 12:
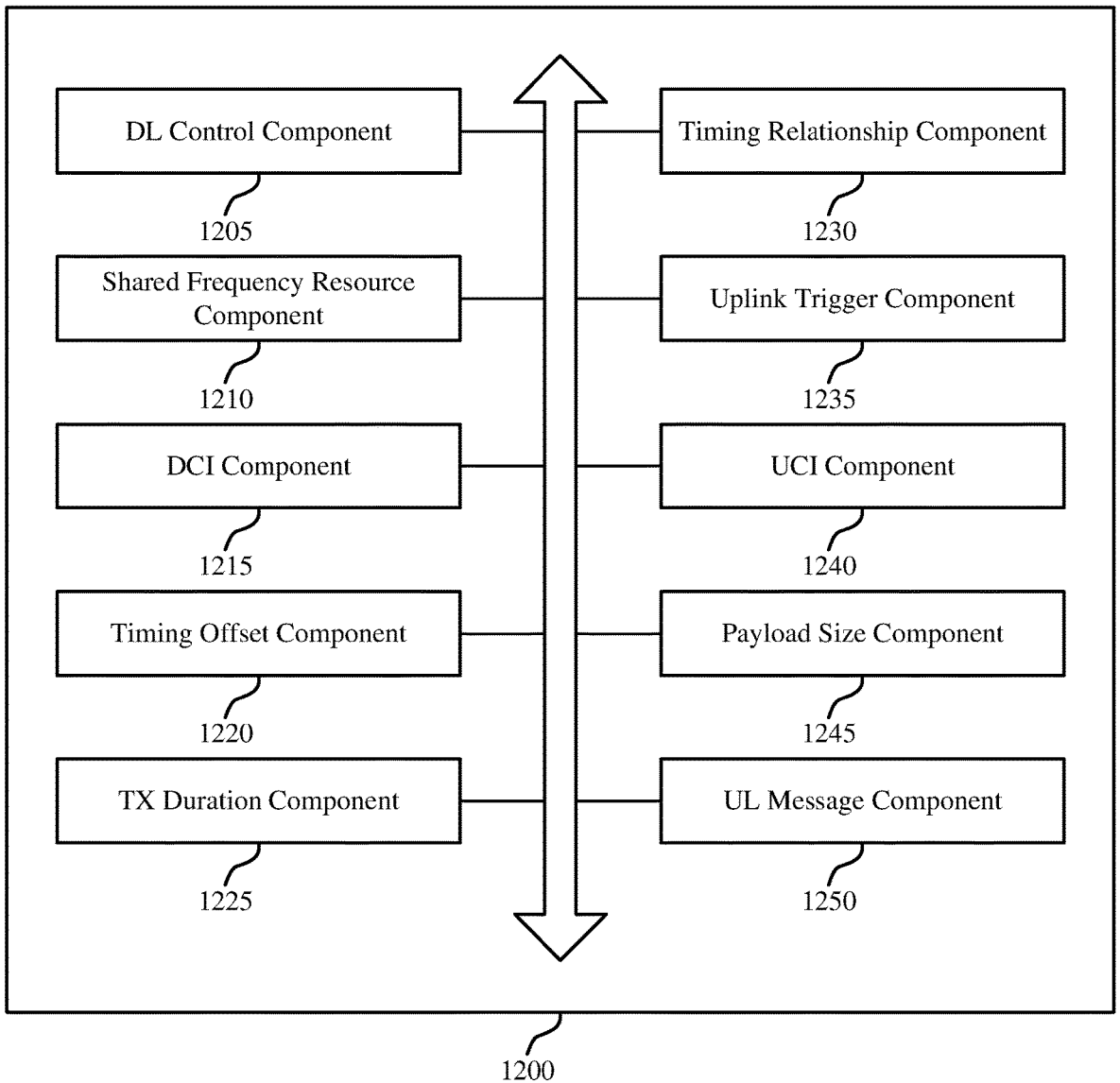

FIG. 12 shows a block diagram of a base station MulteFire manager 1200 which may be an example of the corresponding component of wireless device 1000 or wireless device 1100. That is, base station MulteFire manager 1200 may be an example of aspects of base station MulteFire manager 1015 or base station MulteFire manager 1110 described with reference to FIGS. 10 and 11. The base station MulteFire manager 1200 may also be an example of aspects of the base station MulteFire manager 1305 described with reference to FIG. 13.

The base station MulteFire manager 1200 may include DL control component 1205, shared frequency resource component 1210, DCI component 1215, timing offset component 1220, TX duration component 1225, timing relationship component 1230, uplink trigger component 1235, UCI component 1240, payload size component 1245 and UL message component 1250. Each of these modules may communicate, directly or indirectly, with one another (e.g., via one or more buses).

The DL control component 1205 may transmit a common downlink control message that includes an indication of available uplink frequency resources of a shared radio frequency spectrum band, and transmit a downlink control message during a first TxOP. In some cases, the common downlink control message includes an indication of the payload size and the payload size is determined based on the indication.

The shared frequency resource component 1210 may identify frequency resources of a shared radio frequency spectrum band for transmission of an uplink message based on the downlink control message. The DCI component 1215 may select a DCI format of the downlink control message, configure an indicator in DCI of the downlink control message, configure an indicator in DCI of the downlink control message, and configure an indicator in DCI of the downlink control message.

The timing offset component 1220 may determine a timing offset for the at least one uplink message based on the indicator. The TX duration component 1225 may determine a duration of uplink transmissions based on the indicator.

The timing relationship component 1230 may configure a timing relationship between the downlink control message and an uplink triggering message. The uplink trigger component 1235 may transmit the uplink triggering message according to the timing relationship.

The UCI component 1240 may identify the UCI to be included in the unscheduled uplink control message based on a number of component carriers for which to acknowledge transmissions, a number of HARQ processes, a number of bits to CSI, a system bandwidth, a UCI multiplexing scheme, or a UE coverage range, wherein the payload size is determined based on identifying the UCI.

The payload size component 1245 may determine a payload size of an unscheduled uplink control message based on UCI included in the unscheduled uplink control message, and detect the payload size based on the set of available payload sizes. In some cases, determining the payload size comprises: identifying a set of available payload sizes.

The UL message component 1250 may receive an unscheduled uplink control message using the available uplink frequency resources, receive at least one uplink message on the frequency resources during the first TxOP or a second TxOP based at least in part the downlink control message, determine to receive the at least one uplink message during the first TxOP or the second TxOP based on the DCI format of the downlink control message, and determine to receive the at least one uplink message during the first TxOP or the second TxOP based on the indicator in the DCI.

Figure 13:
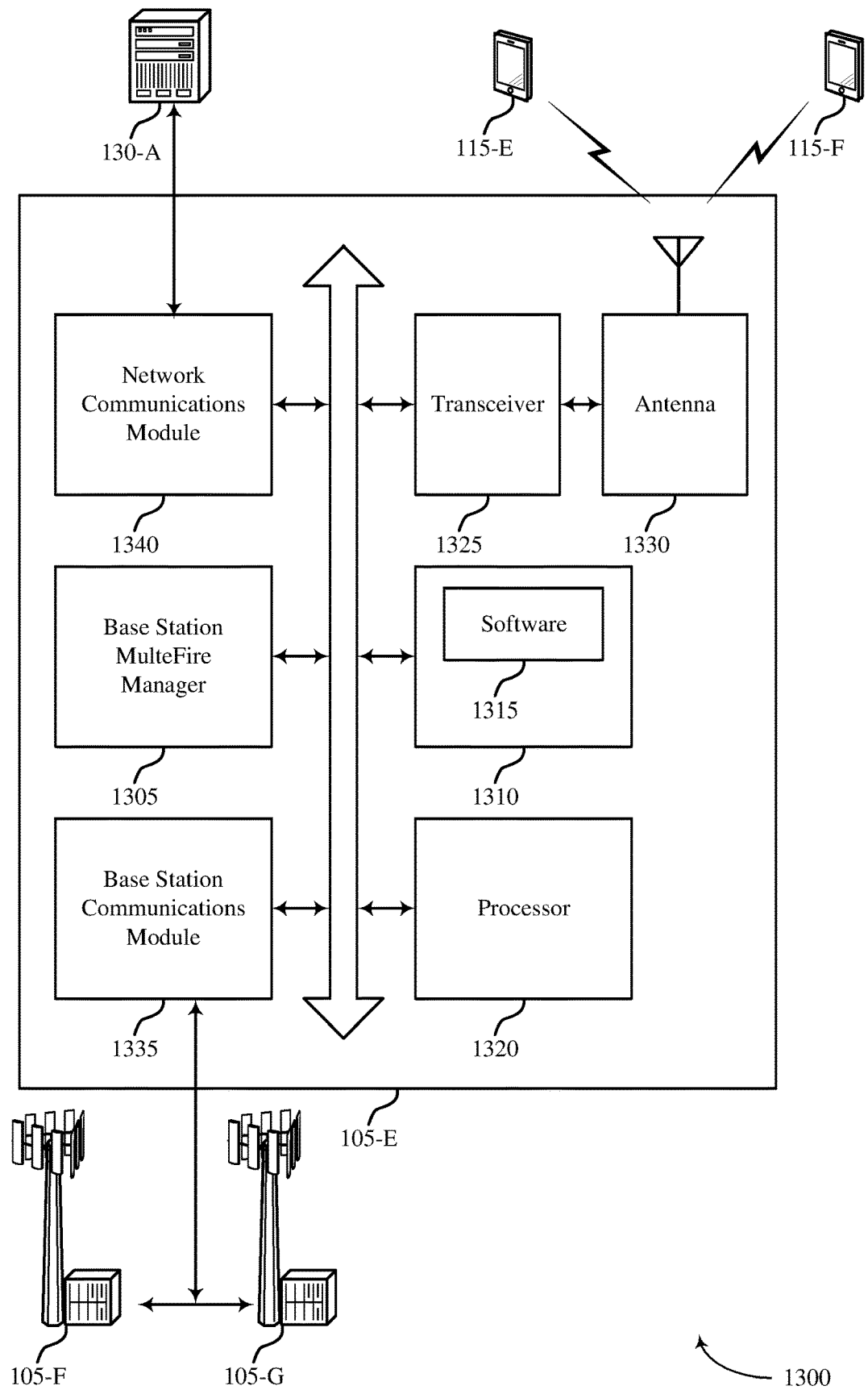
FIG. 13 illustrates a block diagram of a system including a base station that supports uplink payload determination and uplink grant indication for MulteFire in accordance with aspects of the present disclosure.

FIG. 13 shows a diagram of a wireless system 1300 including a device that supports uplink payload determination and uplink grant indication for MulteFire in accordance with aspects of the present disclosure. For example, system 1300 may include base station 105-e, which may be an example of a wireless device 1000, a wireless device 1100, or a base station 105 as described with reference to FIGS. 1, 2 and 10 through 12. Base station 105-e may also include components for bi-directional voice and data communications including components for transmitting communications and components for receiving communications. For example, base station 105-e may communicate bi-directionally with one or more UEs 115.

Base station 105-*e* may also include base station Multe-Fire manager 1305, memory 1310, processor 1320, transceiver 1325, antenna 1330, base station communications module 1335 and network communications module 1340. Each of these modules may communicate, directly or indirectly, with one another (e.g., via one or more buses). The base station MulteFire manager 1305 may be an example of a base station MulteFire manager as described with reference to FIGS. 10 through 12.

The memory 1310 may include RAM and ROM. The memory 1310 may store computer-readable, computer-executable software including instructions that, when executed, cause the apparatus to perform various functions described herein (e.g., uplink payload determination and uplink grant indication for MulteFire, etc.). In some cases, the software 1315 may not be directly executable by the processor but may cause a computer (e.g., when compiled and executed) to perform functions described herein. The processor 1320 may include an intelligent hardware device, (e.g., a CPU, a microcontroller, an ASIC, etc.)

The transceiver 1325 may communicate bi-directionally, via one or more antennas, wired, or wireless links, with one or more networks, as described above. For example, the transceiver 1325 may communicate bi-directionally with a base station 105 or a UE 115. The transceiver 1325 may also include a modem to modulate the packets and provide the modulated packets to the antennas for transmission, and to demodulate packets received from the antennas.

In some cases, the wireless device may include a single antenna 1330. However, in some cases the device may have more than one antenna 930, which may be capable of concurrently transmitting or receiving multiple wireless transmissions.

The base station communications module 1335 may manage communications with other base station 105, and may include a controller or scheduler for controlling communications with UEs 115 in cooperation with other base stations 105. For example, the base station communications module 1335 may coordinate scheduling for transmissions to UEs 115 for various interference mitigation techniques such as beamforming or joint transmission. In some examples, base station communications module 1335 may provide an X2 interface within an LTE/LTE-A wireless communication network technology to provide communication between base stations 105.

The network communications module 1340 may manage communications with the core network (e.g., via one or more wired backhaul links). For example, the network communications module 1340 may manage the transfer of data communications for client devices, such as one or more UEs 115.

Figure 14:
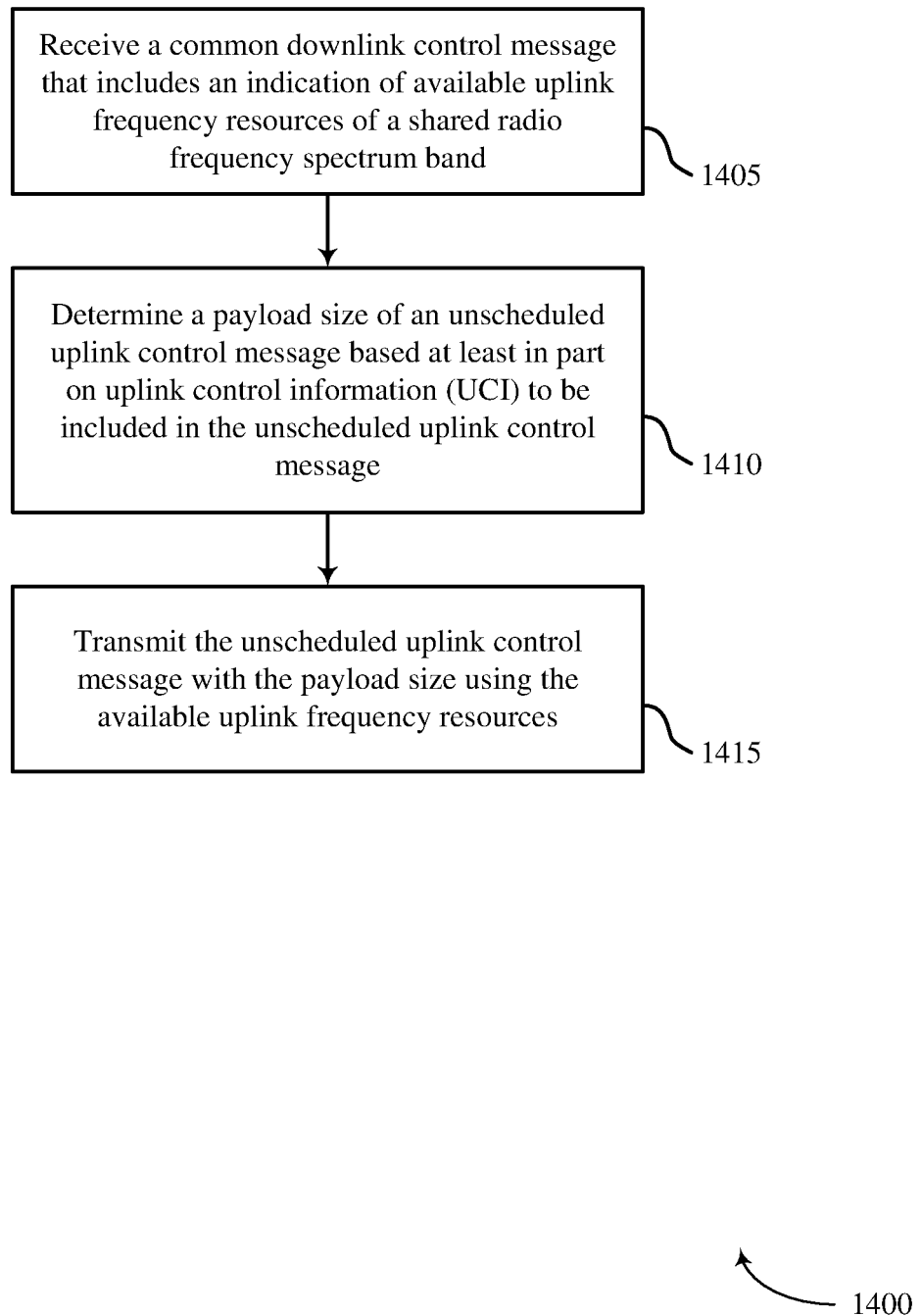
FIGS. 14 through 17 show flowcharts illustrating methods for uplink payload determination and uplink grant indication for MulteFire in accordance with aspects of the present disclosure.

FIG. 14 shows a flowchart illustrating a method 1400 for uplink payload determination and uplink grant indication for MulteFire in accordance with aspects of the present disclosure. The operations of method 1400 may be implemented by a device such as a UE 115 or its components as described with reference to FIGS. 1 and 2. For example, the operations of method 1400 may be performed by the UE MulteFire manager as described herein. In some examples, the UE 115 may execute a set of codes to control the functional elements of the device to perform the functions described below. Additionally or alternatively, the UE 115 may perform aspects the functions described below using special-purpose hardware.

At block 1405, the UE 115 may receive a common downlink control message that includes an indication of available uplink frequency resources of a shared radio frequency spectrum band as described above with reference to FIGS. 2 through 5. In certain examples, the operations of block 1405 may be performed by the receiver 705 described with reference to FIG. 7 or the DL control component as described with reference to FIGS. 7 and 8.

At block 1410, the UE 115 may determine a payload size of an unscheduled uplink control message based on uplink control information (UCI) to be included in the unscheduled uplink control message as described above with reference to FIGS. 2 through 5. In certain examples, the operations of block 1410 may be performed by the payload size component as described with reference to FIGS. 7 and 8.

At block 1415, the UE 115 may transmit the unscheduled uplink control message with the payload size using the available uplink frequency resources as described above with reference to FIGS. 2 through 5. In certain examples, the operations of block 1415 may be performed by the transmitter 740 described with reference to FIG. 7 or the UL message component as described with reference to FIGS. 7 and 8.

Figure 15:
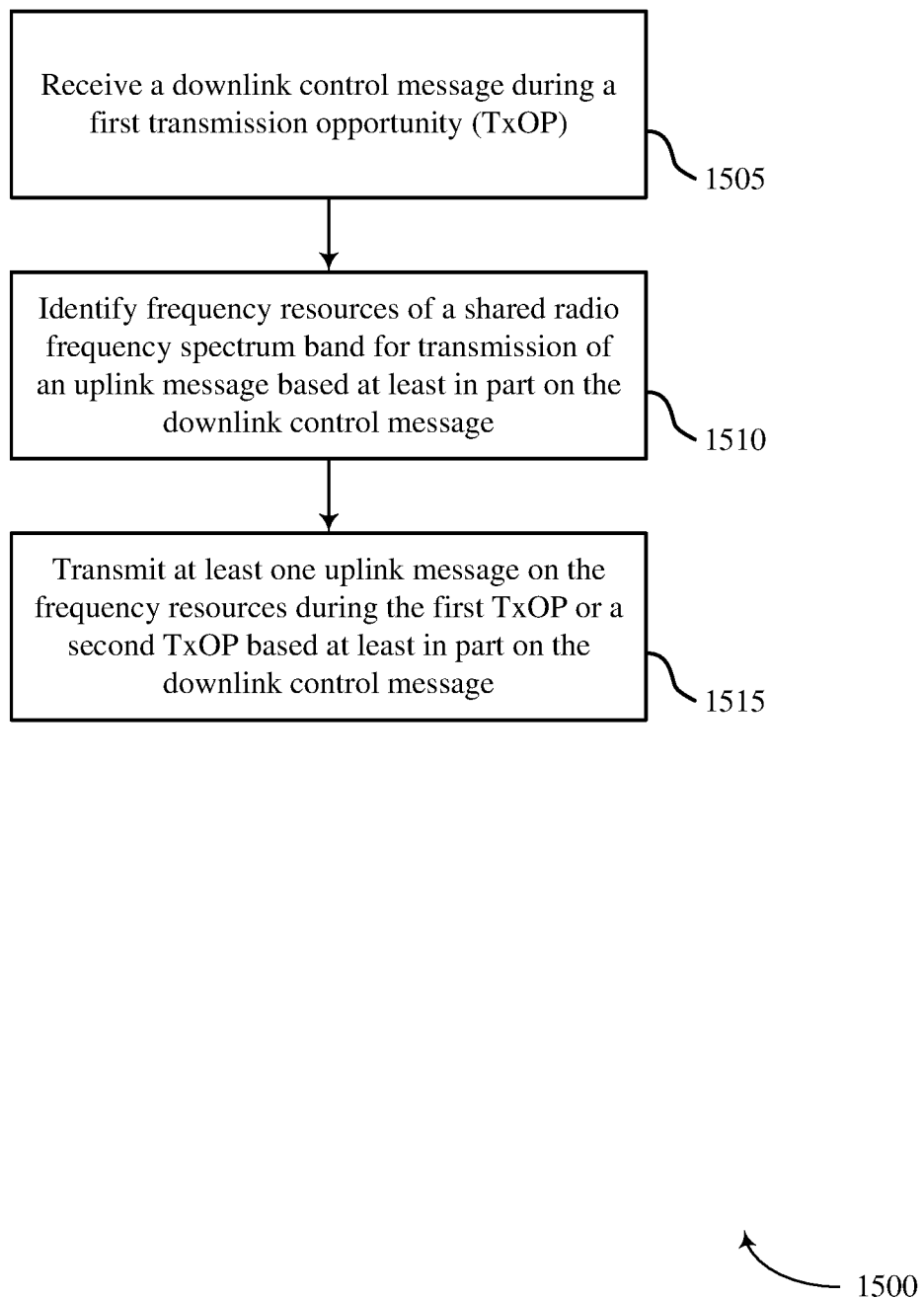

FIG. 15 shows a flowchart illustrating a method 1500 for uplink payload determination and uplink grant indication for MulteFire in accordance with aspects of the present disclosure. The operations of method 1500 may be implemented by a device such as a UE 115 or its components as described with reference to FIGS. 1 and 2. For example, the operations of method 1500 may be performed by the UE MulteFire manager as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may receive a downlink control message during a first TxOP as described above with reference to FIGS. 2 through 5. In certain examples, the operations of block 1505 may be performed by the receiver 705 described with reference to FIG. 7 or the DL control component as described with reference to FIGS. 7 and 8.

At block 1510, the UE 115 may identify frequency resources of a shared radio frequency spectrum band for transmission of an uplink message based on the downlink control message as described above with reference to FIGS. 2 through 5. In certain examples, the operations of block 1510 may be performed by the shared frequency resource component as described with reference to FIGS. 7 and 8.

At block 1515, the UE 115 may transmit at least one uplink message on the frequency resources during the first TxOP or a second TxOP based at least in part the downlink control message as described above with reference to FIGS. 2 through 5. In certain examples, the operations of block 1515 may be performed by the transmitter 740 described with reference to FIG. 7 or the UL message component as described with reference to FIGS. 7 and 8.

Figure 16:
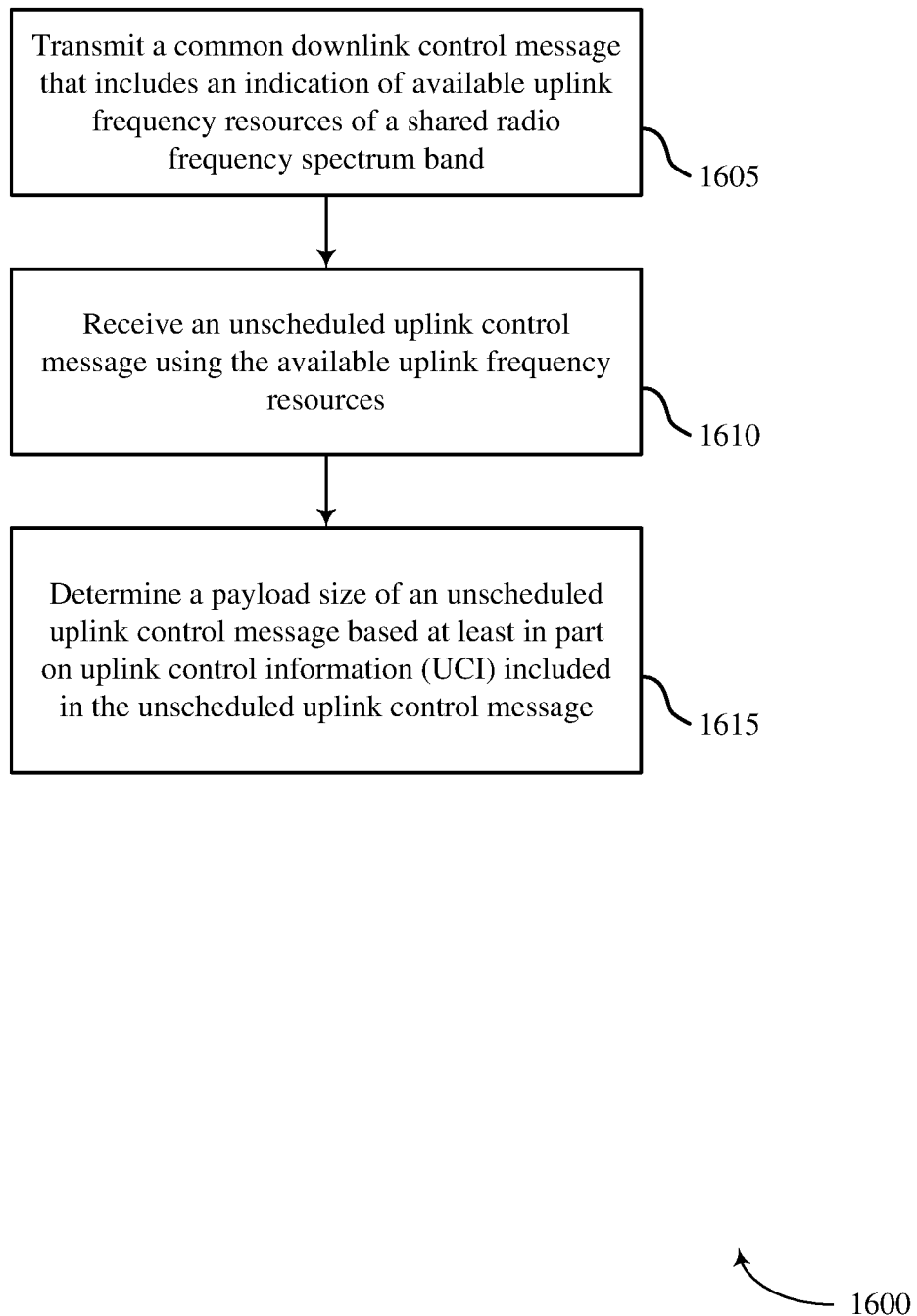

FIG. 16 shows a flowchart illustrating a method 1600 for uplink payload determination and uplink grant indication for MulteFire in accordance with aspects of the present disclosure. The operations of method 1600 may be implemented by a device such as a base station 105 or its components as described with reference to FIGS. 1 and 2. For example, the operations of method 1600 may be performed by the base station MulteFire manager as described herein. In some examples, the base station 105 may execute a set of codes to control the functional elements of the device to perform the functions described below. Additionally or alternatively, the base station 105 may perform aspects the functions described below using special-purpose hardware.

At block 1605, the base station 105 may transmit a common downlink control message that includes an indication of available uplink frequency resources of a shared radio frequency spectrum band as described above with reference to FIGS. 2 through 5. In certain examples, the operations of block 1605 may be performed by the transmitter 1135 described with reference to FIG. 11 or the DL control component as described with reference to FIGS. 11 and 12.

At block 1610, the base station 105 may receive an unscheduled uplink control message using the available uplink frequency resources as described above with reference to FIGS. 2 through 5. In certain examples, the operations of block 1610 may be performed by the receiver 1105 described with reference to FIG. 11 or the UL message component as described with reference to FIGS. 11 and 12.

At block 1615, the base station 105 may determine a payload size of an unscheduled uplink control message based on UCI included in the unscheduled uplink control message as described above with reference to FIGS. 2 through 5. In certain examples, the operations of block 1615 may be performed by the payload size component as described with reference to FIGS. 11 and 12.

Figure 17:
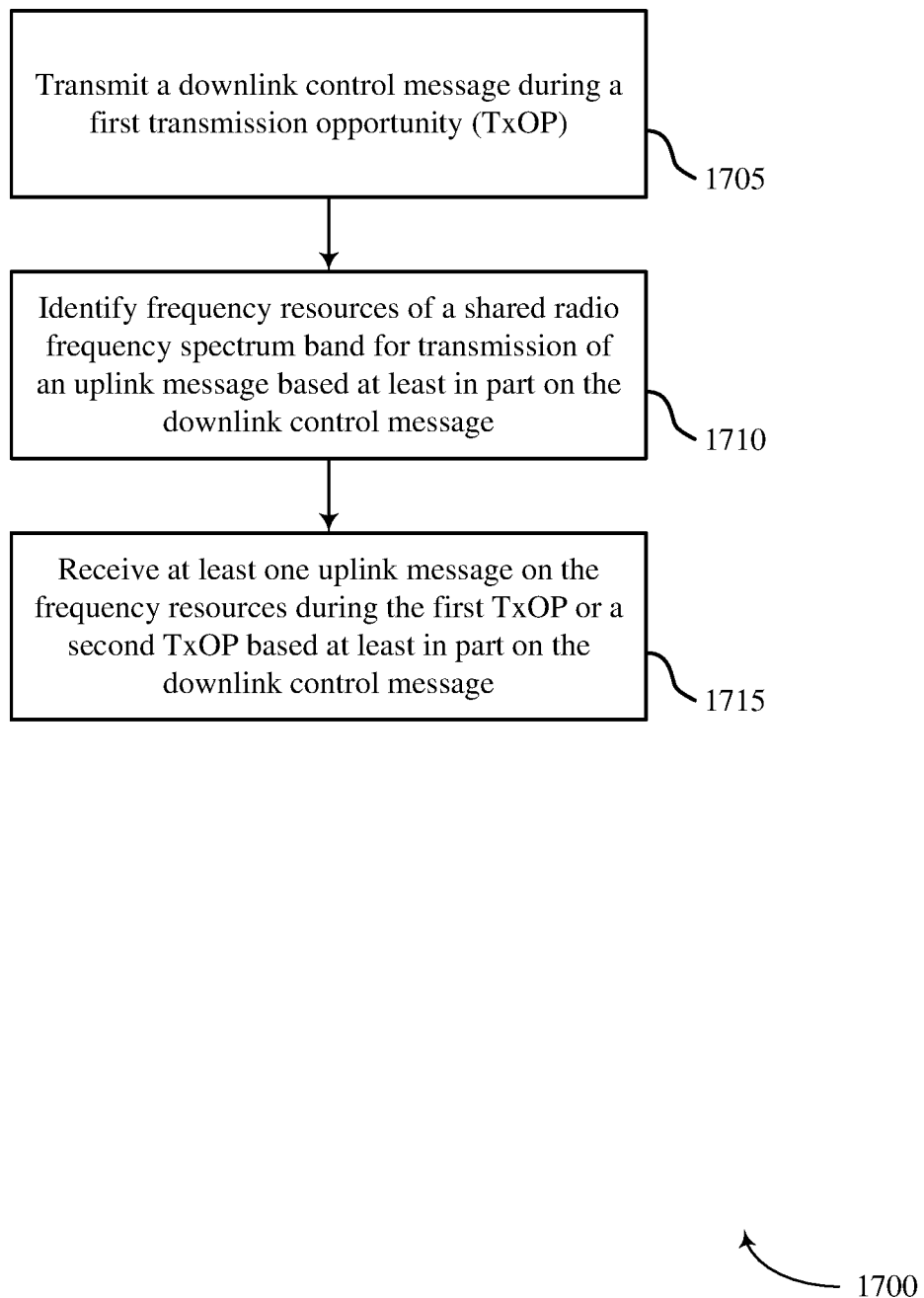

FIG. 17 shows a flowchart illustrating a method 1700 for uplink payload determination and uplink grant indication for MulteFire in accordance with aspects of the present disclosure. The operations of method 1700 may be implemented by a device such as a base station 105 or its components as described with reference to FIGS. 1 and 2. For example, the operations of method 1700 may be performed by the base station MulteFire manager as described herein. In some examples, the base station 105 may execute a set of codes to control the functional elements of the device to perform the functions described below. Additionally or alternatively, the base station 105 may perform aspects the functions described below using special-purpose hardware.

At block 1705, the base station 105 may transmit a downlink control message during a first TxOP as described above with reference to FIGS. 2 through 5. In certain examples, the operations of block 1705 may be performed by the transmitter 1135 described with reference to FIG. 11 or the DL control component as described with reference to FIGS. 11 and 12.

At block 1710, the base station 105 may identify frequency resources of a shared radio frequency spectrum band for transmission of an uplink message based on the downlink control message as described above with reference to FIGS. 2 through 5. In certain examples, the operations of block 1710 may be performed by the shared frequency resource component as described with reference to FIGS. 11 and 12.

At block 1715, the base station 105 may receive at least one uplink message on the frequency resources during the first TxOP or a second TxOP based at least in part the downlink control message as described above with reference to FIGS. 2 through 5. In certain examples, the operations of block 1715 may be performed by the receiver 1105 described with reference to FIG. 11 or the UL message component as described with reference to FIGS. 11 and 12.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for uplink payload determination and uplink grant indication for MulteFire.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different (physical) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile communications (GSM). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (UMTS). 3GPP LTE and LTE-advanced (LTE-A) are new releases of UMTS that use UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for uplink payload determination and uplink grant indication for MulteFire. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication at a base station, comprising:
    transmitting, by the base station, a common downlink control message that includes an indication of available uplink frequency resources of a shared radio frequency spectrum band, and a trigger for a user equipment (UE) to transmit an unscheduled uplink control message using the available uplink frequency resources; and
    receiving, from the UE, the unscheduled uplink control message using the available uplink frequency resources, wherein the unscheduled uplink control message comprises a payload having a control information payload size determined from a set of available control information payload sizes based at least in part on uplink control information (UCI) included in the unscheduled uplink control message.

2. The method of claim 1, wherein the UCI included in the unscheduled uplink control message is determined based at least in part on a number of component carriers for which to acknowledge transmissions, a number of hybrid automatic repeat request (HARQ) processes, a number of bits to convey channel state information (CSI), a system bandwidth, a UCI multiplexing scheme, or a user equipment (UE) coverage range.

3. The method of claim 1, further comprising:
    detecting the control information payload size based at least in part on the set of available control information payload sizes.

4. The method of claim 1, wherein the common downlink control message includes an indication of the control information payload size and the control information payload size is determined based at least in part on the indication.

5. The method of claim 1, wherein the unscheduled uplink control message is received using four or fewer modulation symbols associated with the available uplink frequency resources.

6. The method of claim 1, wherein the indication of the available uplink frequency resources is an indication of a subframe type.

7. The method of claim 1, wherein the common downlink control message includes additional information associated with a format of the UCI to be included in the unscheduled uplink control message.

8. The method of claim 1, wherein the available uplink frequency resources are associated with a special subframe that includes resources designated for both uplink and downlink communication.

9. The method of claim 1, wherein the available uplink frequency resources are associated with a periodic uplink subframe.

10. The method of claim 9, wherein the periodic uplink subframe is designated for random access transmissions.

11. An apparatus for wireless communication at a base station, comprising:
    a processor;
    memory coupled to the processor; and
    instructions stored in the memory and operable, when executed by the processor, to cause the apparatus to:
        transmit, by the base station, a common downlink control message that includes an indication of available uplink frequency resources of a shared radio frequency spectrum band, and a trigger for a user equipment (UE) to transmit an unscheduled uplink control message using the available uplink frequency resources; and
        receive, from the UE, the unscheduled uplink control message using the available uplink frequency resources, wherein the unscheduled uplink control message comprises a payload having a control information payload size determined from a set of available control information payload sizes based at least in part on uplink control information (UCI) included in the unscheduled uplink control message.

12. The apparatus of claim 11, wherein the UCI included in the unscheduled uplink control message is determined based at least in part on a number of component carriers for which to acknowledge transmissions, a number of hybrid automatic repeat request (HARQ) processes, a number of bits to convey channel state information (CSI), a system bandwidth, a UCI multiplexing scheme, or a user equipment (UE) coverage range.

13. The apparatus of claim 11, further comprising instructions operable to cause the apparatus to:
    detect the control information payload size based at least in part on the set of available control information payload sizes.

14. The apparatus of claim 11, wherein the common downlink control message includes an indication of the control information payload size and the control information payload size is determined based at least in part on the indication.

15. The apparatus of claim 11, wherein the unscheduled uplink control message is received using four or fewer modulation symbols associated with the available uplink frequency resources.

16. The apparatus of claim 11, wherein the indication of the available uplink frequency resources is an indication of a subframe type.

17. The apparatus of claim 11, wherein the common downlink control message includes additional information associated with a format of the UCI to be included in the unscheduled uplink control message.

18. The apparatus of claim 11, wherein the available uplink frequency resources are associated with a special subframe that includes resources designated for both uplink and downlink communication.

19. The apparatus of claim 11, wherein the available uplink frequency resources are associated with a periodic uplink subframe.

20. The apparatus of claim 19, wherein the periodic uplink subframe is designated for random access transmissions.

21. A non-transitory computer-readable medium storing code for wireless communication at a base station, the code comprising instructions executable to:

transmit, by the base station, a common downlink control message that includes an indication of available uplink frequency resources of a shared radio frequency spectrum band, and a trigger for a user equipment (UE) to transmit an unscheduled uplink control message using the available uplink frequency resources; and receive, from the UE, the unscheduled uplink control message using the available uplink frequency resources, wherein the unscheduled uplink control message comprises a payload having a control information payload size determined from a set of available control information payload sizes based at least in part on uplink control information (UCI) included in the unscheduled uplink control message.

22. The non-transitory computer-readable medium of claim 21, wherein the UCI included in the unscheduled uplink control message is determined based at least in part on a number of component carriers for which to acknowledge transmissions, a number of hybrid automatic repeat request (HARQ) processes, a number of bits to convey channel state information (CSI), a system bandwidth, a UCI multiplexing scheme, or a user equipment (UE) coverage range.

23. The non-transitory computer-readable medium of claim 21, further comprising instructions executable to:
detect the control information payload size based at least in part on the set of available control information payload sizes.

24. The non-transitory computer-readable medium of claim 21, wherein the common downlink control message includes an indication of the control information payload size and the control information payload size is determined based at least in part on the indication.

25. The non-transitory computer-readable medium of claim 21, wherein the unscheduled uplink control message is received using four or fewer modulation symbols associated with the available uplink frequency resources.

26. The non-transitory computer-readable medium of claim 21, wherein the indication of the available uplink frequency resources is an indication of a subframe type.

27. The non-transitory computer-readable medium of claim 21, wherein the common downlink control message includes additional information associated with a format of the UCI to be included in the unscheduled uplink control message.

28. The non-transitory computer-readable medium of claim 21, wherein the available uplink frequency resources are associated with a special subframe that includes resources designated for both uplink and downlink communication.

29. The non-transitory computer-readable medium of claim 21, wherein the available uplink frequency resources are associated with a periodic uplink subframe.

30. The non-transitory computer-readable medium of claim 29, wherein the periodic uplink subframe is designated for random access transmissions.

31. An apparatus for wireless communication at a base station, comprising:
means for transmitting, by the base station, a common downlink control message that includes an indication of available uplink frequency resources of a shared radio frequency spectrum band, and a trigger for a user equipment (UE) to transmit an unscheduled uplink control message using the available uplink frequency resources; and means for receiving, from the UE, the unscheduled uplink control message using the available uplink frequency resources, wherein the unscheduled uplink control message comprises a payload having a control information payload size determined from a set of available control information payload sizes based at least in part on uplink control information (UCI) included in the unscheduled uplink control message.

32. The apparatus of claim 31, wherein the UCI included in the unscheduled uplink control message is determined based at least in part on a number of component carriers for which to acknowledge transmissions, a number of hybrid automatic repeat request (HARQ) processes, a number of bits to convey channel state information (CSI), a system bandwidth, a UCI multiplexing scheme, or a user equipment (UE) coverage range.

33. The apparatus of claim 31, further comprising:
means for detecting the control information payload size based at least in part on the set of available control information payload sizes.

34. The apparatus of claim 31, wherein the common downlink control message includes an indication of the control information payload size and the control information payload size is determined based at least in part on the indication.

35. The apparatus of claim 31, wherein the unscheduled uplink control message is received using four or fewer modulation symbols associated with the available uplink frequency resources.

36. The apparatus of claim 31, wherein the indication of the available uplink frequency resources is an indication of a subframe type.

37. The apparatus of claim 31, wherein the common downlink control message includes additional information associated with a format of the UCI to be included in the unscheduled uplink control message.

38. The apparatus of claim 31, wherein the available uplink frequency resources are associated with a special subframe that includes resources designated for both uplink and downlink communication.

39. The apparatus of claim 31, wherein the available uplink frequency resources are associated with a periodic uplink subframe.

40. The apparatus of claim 39, wherein the periodic uplink subframe is designated for random access transmissions.

* * * * *